United States Patent
Yumoto et al.

(10) Patent No.: US 10,404,902 B2
(45) Date of Patent: Sep. 3, 2019

(54) INFORMATION TERMINAL APPARATUS, INFORMATION PROCESSING SYSTEM, INFORMATION PROCESSING METHOD AND RECORDING MEDIUM THAT RECORDS INFORMATION PROCESSING PROGRAM

(71) Applicant: OLYMPUS CORPORATION, Hachioji-shi, Tokyo (JP)

(72) Inventors: Kenta Yumoto, Hachioji (JP); Koichi Shintani, Hachioji (JP); Yoshihisa Ogata, Hachioji (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/918,381

(22) Filed: Mar. 12, 2018

(65) Prior Publication Data
US 2018/0262675 A1 Sep. 13, 2018

(30) Foreign Application Priority Data

Mar. 13, 2017 (JP) .................................. 2017-047643

(51) Int. Cl.
*H04N 5/232* (2006.01)
*G11B 27/031* (2006.01)
(Continued)

(52) U.S. Cl.
CPC ....... *H04N 5/23203* (2013.01); *G11B 27/031* (2013.01); *H04N 5/232* (2013.01); *H04N 5/77* (2013.01); *H04W 88/02* (2013.01)

(58) Field of Classification Search
CPC .... G11B 27/031; H04N 5/23203; H04N 5/77; H04W 88/02
See application file for complete search history.

(56) References Cited

U.S. PATENT DOCUMENTS 7,139,565 B2 * 11/2006 Fiatal .................... H04W 76/10
455/423
2004/0252217 A1 * 12/2004 Battles ................... H04N 5/232
348/333.01
(Continued)

FOREIGN PATENT DOCUMENTS

JP 2009-267666 A 11/2009

*Primary Examiner* — Amy R Hsu
(74) *Attorney, Agent, or Firm* — Volpe and Koenig, P.C.

(57) ABSTRACT

An information terminal apparatus includes: a function execution section that executes an acquisition function which acquires a sound or an image that is of a same kind as an acquisition function which acquires a sound or an image that an external device includes, as a substitutional function instead of the external device; a display section; a communication section that performs communication with one or more external devices that co-operate with the information terminal apparatus; and a control section that, in a co-operation mode, before co-operating with the external device and causing execution of the acquisition function which acquires a sound or an image that the external device includes through the communication section, executes a co-operation preparation mode that includes causing the substitutional function of the function execution section to be executed and display control for performing settings relating to the acquisition function which acquires a sound or an image.

14 Claims, 12 Drawing Sheets

(51) Int. Cl.
*H04N 5/77* (2006.01)
*H04W 88/02* (2009.01)

(56) References Cited

U.S. PATENT DOCUMENTS

2006/0268122 A1* 11/2006 Iwasaki .............. H04N 1/32037
348/231.3
2016/0157282 A1* 6/2016 Ye ...................... H04N 5/23216
455/556.1
2017/0187945 A1* 6/2017 Ikeda ....................... G02B 7/08
2017/0195561 A1* 7/2017 Hegelich ............ H04N 5/23238

* cited by examiner

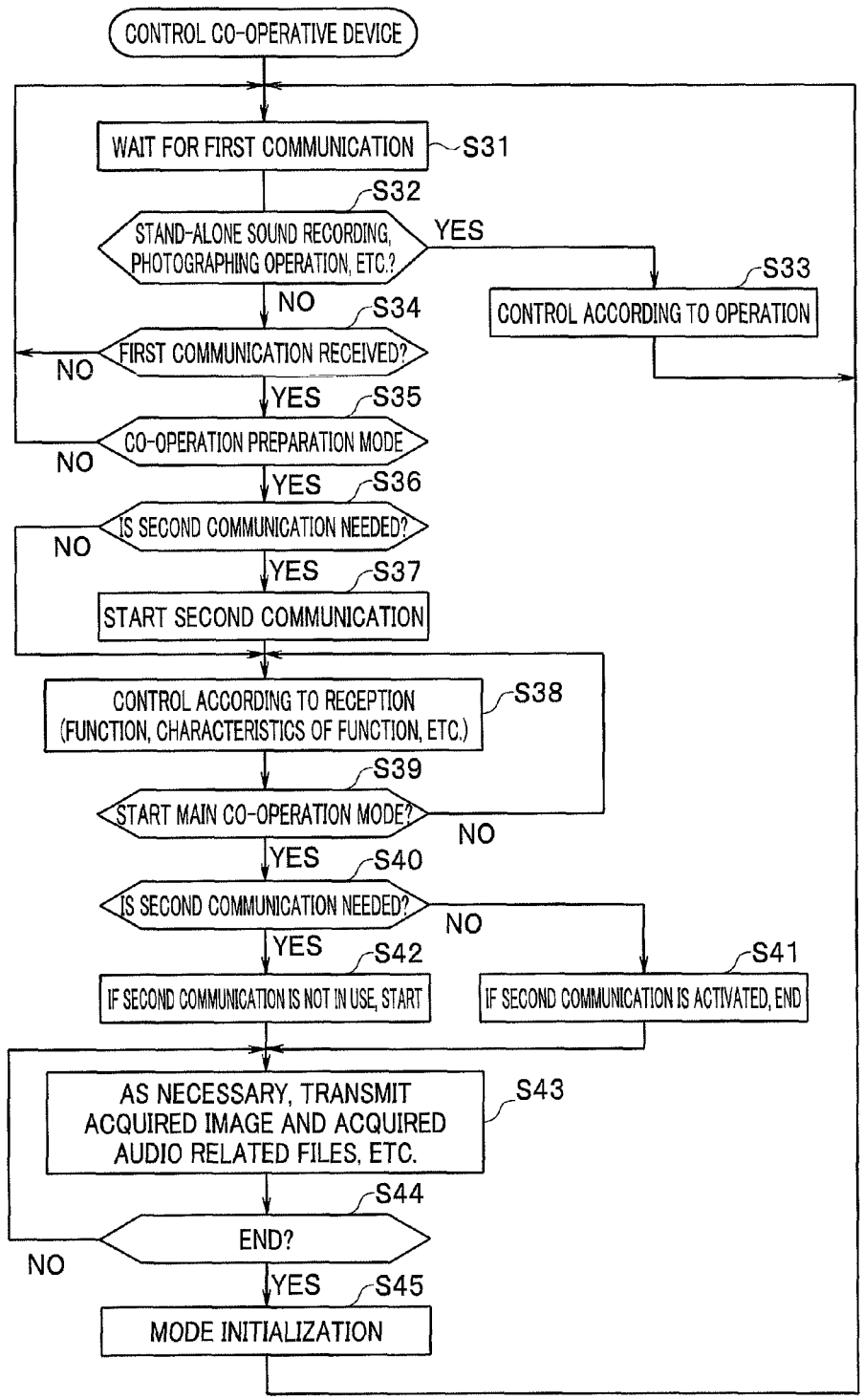

INFORMATION TERMINAL APPARATUS, INFORMATION PROCESSING SYSTEM, INFORMATION PROCESSING METHOD AND RECORDING MEDIUM THAT RECORDS INFORMATION PROCESSING PROGRAM

CROSS REFERENCE TO RELATED APPLICATION

This application claims the benefit of Japanese Application No. 2017-047643 filed in Japan on Mar. 13, 2017, the contents of which are incorporated herein by this reference.

BACKGROUND OF THE INVENTION

Field of the Invention

The present invention relates to an information terminal apparatus, an information processing system, an information processing method and a recording medium on which an information processing program is recorded that are suitable for information processing for the so-called "IoT (Internet of things)" that realizes desired functions by causing multiple devices to co-operate.

Description of Related Art

In recent years, technology for controlling devices has been sought that overcomes various constraints that have heretofore existed in order to allow smartphones or personal digital assistants such as tablet PCs and note PCs to co-operate with other devices (external devices) to centralize remote operations and information management.

For example, it is conceivable to utilize an information terminal apparatus such as a smartphone to control a photographing device or a sound recording device that acquires information such as image information or audio information by means of a sensor such as an image sensor or a microphone. It is possible to utilize a smartphone as a remote control apparatus to display a screen for controlling a photographing device or a sound recording device or the like on a display panel and to control operations such as photographing or sound recording by performing touch operations.

In addition, in the case of the IoT, it is conceivable that a smartphone or tablet PC or the like can be utilized not only as a remote control apparatus that operates another device through wireless or wired communication, but as necessary, by effectively exploiting built-in functions of the smartphone or tablet PC or by combining use of the smartphone or tablet PC as a control device that acquires information from an external device, the realization of functions or specifications which could not be realized by the external device alone can be enabled.

As one example of such device co-operation, for example, Japanese Patent Application Laid-Open Publication No. 2009-267666 discloses technology that determines whether or not a searched for wireless communication device is present inside a vehicle in which the technology is provided, and performs control with respect to the wireless communication device.

SUMMARY OF THE INVENTION

An information terminal apparatus according to one aspect of the present invention includes: a function execution section configured to execute an acquisition function which acquires a sound or an image that is of a same kind as an acquisition function which acquires a sound or an image that an external device includes, as a substitutional function instead of the external device; a display section; a communication section configured to perform communication with one or more external devices that co-operate with the information terminal apparatus; and a control section configured to, in a co-operation mode, before co-operating with the external device and causing execution of the acquisition function which acquires a sound or an image that the external device includes through the communication section, execute a co-operation preparation mode that includes causing the substitutional function of the function execution section to be executed and display control for performing settings relating to the acquisition function which acquires a sound or an image.

An information processing system according to one aspect of the present invention includes: one or more external devices configured to execute an acquisition function which acquires a sound or an image; and an information terminal apparatus that includes a function execution section configured to execute an acquisition function which acquires a sound or an image that is of a same kind as an acquisition function which acquires a sound or an image that the external devices include, as a substitutional function instead of the external devices, a display section, a communication section configured to perform communication with one or more external devices that co-operate with the information terminal apparatus, and a control section configured to, in a co-operation mode, before co-operating with the external device and causing execution of the acquisition function which acquires a sound or an image that the external device includes through the communication section, execute a co-operation preparation mode that includes causing the substitutional function of the function execution section to be executed and display control for performing settings relating to the acquisition function which acquires a sound or an image.

An information processing method according to one aspect of the present invention includes: a step of performing communication by means of a communication section with one or more external devices configured to execute an acquisition function which acquires a sound or an image; and a step of, in a co-operation mode, while causing an acquisition function which acquires a sound or an image that is of a same kind as the acquisition function which acquires a sound or an image to be executed as a substitutional function instead of the external device, executing a co-operation preparation mode that includes display control for performing settings relating to the acquisition function which acquires a sound or an image of the external device through the communication section.

Further, a medium on which an information processing program is recorded according to one aspect of the present invention records an information processing program for causing a computer to execute: a step of performing communication by means of a communication section with one or more external devices configured to execute an acquisition function which acquires a sound or an image; and a step of, in a co-operation mode, while causing an acquisition function which acquires a sound or an image that is of a same kind as the acquisition function which acquires a sound or an image to be executed as a substitutional function instead of the external device, executing a co-operation preparation mode that includes display control for performing settings relating to the acquisition function which acquires a sound or an image of the external device through the communication section.

The above and other objects, features and advantages of the invention will become more clearly understood from the following description referring to the accompanying drawings.

BRIEF DESCRIPTION OF THE DRAWINGS

FIG. 8 is a flowchart illustrating control of a co-operative device;

DETAILED DESCRIPTION OF PREFERRED EMBODIMENTS

Hereunder, an embodiment of the present invention is described in detail referring to the accompanying drawings.

Figure 1:
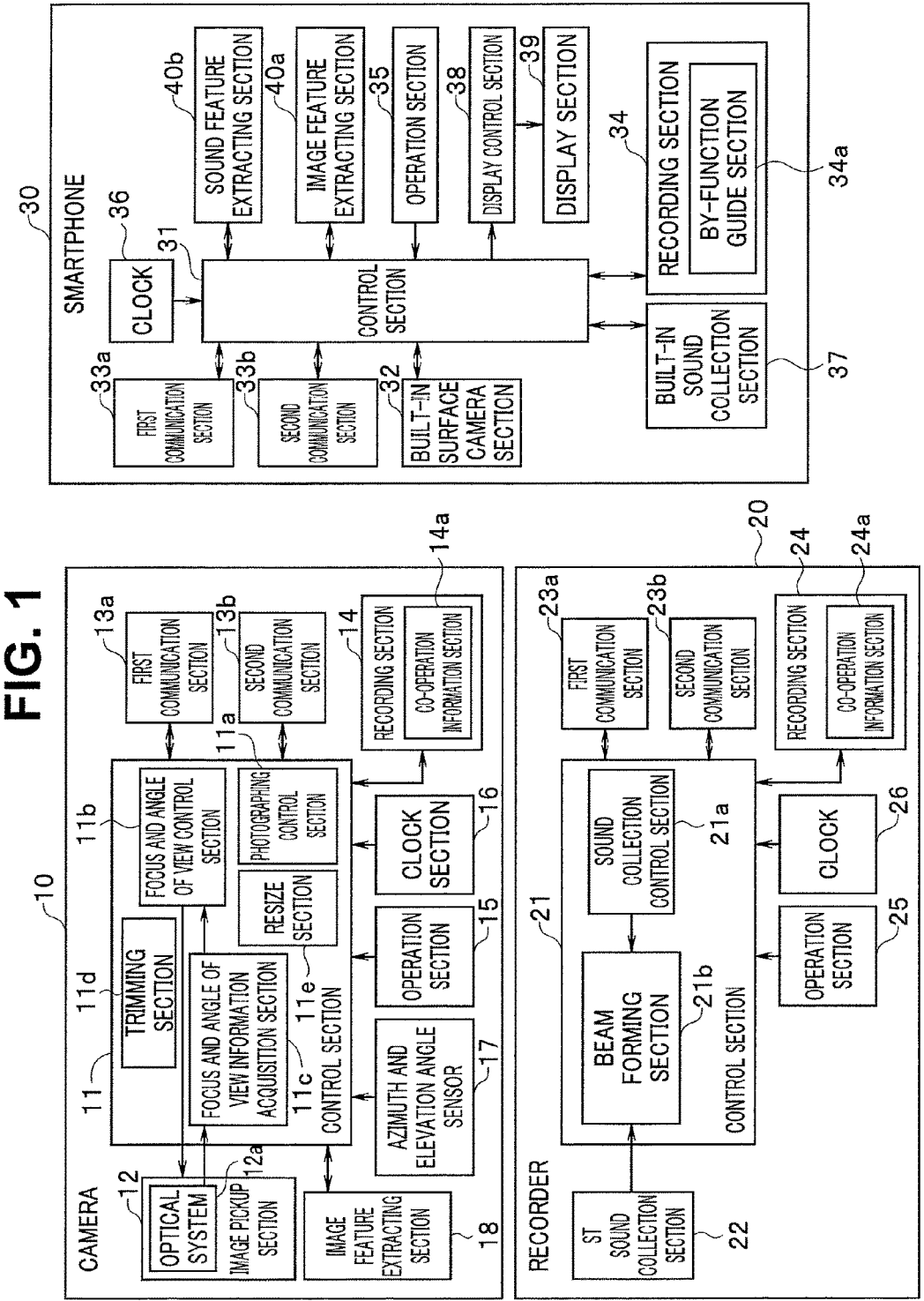
FIG. 1 is a block diagram illustrating an information processing system including an information terminal apparatus according to a first embodiment of the present invention.
Figure 2:
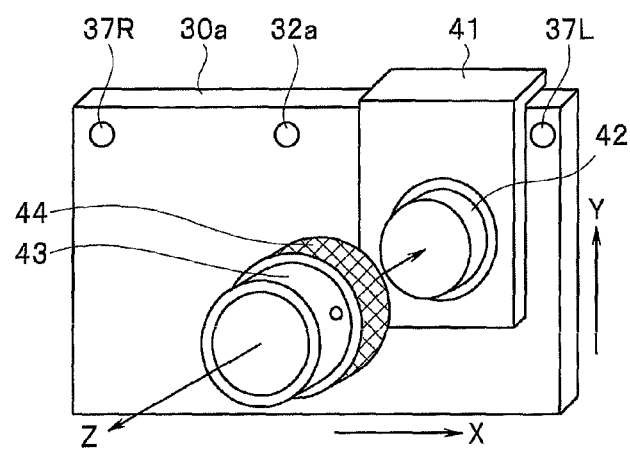
FIG. 2 is an explanatory diagram illustrating an external appearance of a photographing device 10 and a smartphone 30.
Figure 3:
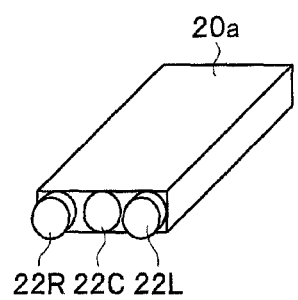
FIG. 3 is an explanatory diagram illustrating an external appearance of a recorder 20.

FIG. 1 is a block diagram illustrating an information processing system including an information terminal apparatus according to one embodiment of the present invention. FIG. 1 illustrates an example in which an information processing system is composed of a tablet PC or smartphone 30 constituting an information terminal apparatus, and a photographing device 10 and a recorder 20 that are external devices. FIG. 2 is an explanatory diagram illustrating an external appearance of the photographing device 10 and the smartphone 30. FIG. 3 is an explanatory diagram illustrating an external appearance of the recorder 20.

In the present embodiment, the external devices have a communication function and are capable of communicating with another device to perform co-operated processing. In recent years, information terminal apparatuses have evolved to include a variety of functions and not just an information processing function, and also tend to co-operate with other devices to further widen the situations in which information terminal apparatuses are utilized. That is, in the embodiment also, communication with the external devices is possible, and operations can be performed in a co-operation mode in which the information terminal apparatus utilizes not only the functions of the information terminal apparatus but also the functions of the external devices and performs effective co-operated processing. In this case, the information terminal apparatus is configured to obtain excellent effects and high performance with respect to functions that are same as or relate to various functions of the respective external devices and own functions of the information terminal apparatus by taking into consideration time periods required to activate the functions and the performance and the like of the functions, and by determining, and foreseeing and, for example, by optimizing control of the sequence of communication with the respective external devices or the switching control for switching between the functions and the like.

For example, in a case where the information terminal apparatus shares an image pickup operation or a sound recording operation with a co-operating external camera or external recorder, recording of a moving image with high image quality and high sound quality can be performed by carrying out co-operated processing such as setting or switching the functions of each external device while utilizing an image pickup function or sound recording function or the like that the information terminal apparatus itself is equipped with. The functions and performance and the like of each device may be inputted in advance to a recording section or the like of the information terminal apparatus, or a system may be adopted whereby the information terminal apparatus can ascertaining the functions and performance and the like of each device by communication, or determine the functions and performance and the like based on the result of communication, or infer the functions and performance and the like by analogy. In this case, it is good for each external device to be configured so as to transmit a name, ID or functions of the external device and to transmit the performance of the external device. When performing communication, for example, the information terminal apparatus acquires desired data in the manner described hereunder.

The information terminal apparatus is configured so that, in such a co-operation mode, to enable co-operation that obtains excellent effects and high performance, the information terminal apparatus first operates in a co-operation preparation mode to carry out settings and the like with respect to the external device that is useful for co-operation, and to cause the external device to perform a trial operation to confirm that desired data can be obtained from the external device. A configuration may be adopted that allows the information terminal apparatus to determine an external device that is useful for such co-operation by a name or ID or the like from a database or the like, or a configuration may be adopted so that, when a built-in function of the information terminal apparatus is activated, the external device side confirms the aforementioned matters by means of the function and the external device itself begins co-operation. In this case, a configuration may be adopted in which the external device inputs obtained information to the information terminal apparatus, and the information terminal apparatus can make a choice regarding whether or not the information is useful after having acquired the information. Further, a configuration may be adopted so that, for example, after confirming that desired data was obtained in the co-operation preparation mode, the information terminal apparatus transitions to a main co-operation mode that actually utilizes a function of the external device.

That is, the information terminal apparatus in this case includes an input section for built-in function activation that is configured to activate a specific built-in function that acquires images or sounds or other specific information. Further, by being equipped with a control section that, accompanying the aforementioned specific built-in function activation, uses a communication section that is configured to perform communication with an external device to enable co-operative recording and co-operative playback of the aforementioned images, sounds or other information from the external device that were obtained by the communication section and information acquired by the aforementioned built-in function, the information terminal apparatus is configured to be capable of effectively utilizing: (a) information that is obtained with better performance and more favorable conditions than corresponding information obtained with a function that is built in the information terminal apparatus; (b) information to be attached to or to supplement information obtained with a built-in function; or (c) information which a built-in function missed capturing.

First, referring to FIG. 2 and FIG. 3, the external appearance of the smartphone 30, the photographing device 10 and the recorder 20 will be described.

As illustrated in FIG. 2, a mounting tool 41 is detachably attached to a case 30a of the smartphone 30 (FIG. 1), and a mounting section 42 for mounting a lens-type camera 10 (FIG. 1) is provided in the mounting tool 41. The lens-type camera 10 has a lens barrel 43 in which an image pickup section 12 is housed, and a mounting section 44 is provided on a proximal end side of the lens barrel 43. The mounting section 44 can be mounted to the mounting section 42 of the mounting tool 41 by being fitted or screwed onto the mounting tool 41 or the like. Openings 37L and 37R for microphones are provided at both ends on the rear face of the case 30a of the smartphone 30, and a lens 32a is provided at the center of the rear face of the case 30a. Note that the camera is not limited to a lens-type camera.

As illustrated in FIG. 3, stereo microphones 22L and 22R are provided at both ends on a side face of a case 20a of the recorder 20, and a non-directional center microphone 22C is provided at the center of the side face.

Referring to FIG. 1, a first communication section 33a and a second communication section 33b are provided in the smartphone 30 that is an information terminal apparatus. A first communication section 13a and a second communication section 13b are provided in the camera 10 which is an external device and has an image pickup function. Further, a first communication section 23a and a second communication section 23b are provided in the recorder 20 which is an external device and has a sound collection function. It is possible for the first communication sections 13a, 23a and 33a and the second communication sections 13b, 23b and 33b to communicate by wired or wireless communication. The first communication sections 13a, 23a and 33a and the second communication sections 13b, 23b and 33b are capable of communication, for example, by high-speed communication by means of a wireless LAN such as WiFi or short-range wireless communication such as communication by Bluetooth (registered trademark). For example, the first communication sections 13a, 23a and 33a may be configured to be capable of short-range communication, and the second communication sections 13b, 23b and 33b may be configured to be capable of WiFi communication.

Note that, with regard to a constant connection, in the case of a device in which electric power can only be held for a short time period, Bluetooth need not be used if WiFi is intermittently performed and a configuration that performs communication starting settings at an early stage beforehand is also adopted together with WiFi communication. Near-field wireless communication (NFC or TransferJet or the like) in which power consumption is not a concern and for which instantaneous connection is possible without the need for pairing may also be adopted for the first communication sections. Since the first communication is communication that it is desired to perform more frequently than the second communication, it is preferable for the power consumption of the first communication to be as less as possible. The reason for using the term "short range" here is because it is desired to lower the amount of power consumption when communicating, and to lengthen the duration of the battery of a device that is driven by a battery or the like.

The smartphone 30 and the camera 10 are configured to be capable of mutual communication through the first communication sections 33a and 13a and are also configured to be capable of mutual communication through the second communication sections 33b and 13b. Further, the smartphone 30 and the recorder 20 are configured to be capable of mutual communication through the first communication sections 33a and 23a and are also configured to be capable of mutual communication through the second communication sections 33b and 23b.

A control section 11 is provided in the camera 10 that is an external device. The control section 11 may be constituted, for example, by a processor that uses a CPU or the like and may control each section by operating in accordance with a program stored in an unshown memory, and a part of the control section 11 may be replaced by an electronic circuit including hardware. The control section 11 controls each section of the camera 10.

The image pickup section 12 in which an optical system 12a is housed is provided inside the lens barrel 43 in the camera 10. Inside the lens barrel 43, the optical system 12a has a focusing lens that is made to be movable for setting a focusing state by focusing and a zoom lens (not shown) that changes the magnification in a focused state or the like. The optical system 12a also has an unshown mechanism section that drives these lenses and the aperture.

An image pickup device, not shown in the drawings, which is constituted by a CCD, a CMOS sensor or the like is provided in the image pickup section 12. An object optical image is guided to an image pickup surface of the image pickup device by the optical system 12a. The control section 11 is configured to control the mechanism section of the optical system 12a so as to control driving of the focusing lens, zoom lens and aperture. The image pickup device subjects the object optical image to photoelectric conversion to obtain a picked-up image.

An operation section 15 is also provided in the camera 10. The operation section 15 provides an operation signal that is based on a user operation to the control section 11. The control section 11 is configured to be also capable of controlling each section of the camera 10 based on an operation signal from the operation section 15. A clock section 16 is also provided in the camera 10. The clock section 16 is configured to supply time information to the control section 11.

A photographing control section 11a is configured to supply a drive signal to the image pickup device of the image pickup section 12 to cause the image pickup device to pick up an image of an object. A focus and angle of view control section 11b is configured to drive the respective lenses of the optical system 12a to perform focusing and zooming by means of focusing control and zoom control that are based on a user operation at the operation section 15 or based on an instruction from the smartphone 30.

A focus and angle of view information acquisition section 11c acquires photographing information that includes at least one kind of information among lens information relating to lenses such a lens state of the zoom lens, focusing lens or the like and an aperture state or the like, and information relating to photographing such as the angle of view. The focus and angle of view information acquisition section 11c outputs the acquired information to the focus and angle of view control section 11b. The focus and angle of view control section 11b is configured to control the image pickup section 12 based on the information outputted by the focus and angle of view information acquisition section 11c so as to adjust the focus and photographing angle of view.

The focus and angle of view information acquisition section 11 c is also configured to be capable of transferring acquired photographing information to the smartphone 30 through the first communication section 13a.

The control section 11 receives a picked-up image from the image pickup section 12, and after subjecting the picked-up image to predetermined image signal processing, for example, color adjustment processing, matrix conversion processing, and noise elimination processing as well as various other kinds of signal processing, can send the resulting picked-up image to a recording section 14 to record the picked-up image. For example, an IC memory can be used as the recording section. 14. The control section 11 is configured to be also capable of transferring a picked-up image to the smartphone 30 through the second communication section 13b.

In the present embodiment, the recording section 14 includes a co-operation information section 14a configured to record information relating to co-operation with the co-operating smartphone 30.

An azimuth and elevation angle sensor 17 is also provided in the camera 10. The azimuth and elevation angle sensor 17 is configured to detect a posture of the image pickup section 12 of the camera 10, and output the detection result to the control section 11. Based on the detection result of the azimuth and elevation angle sensor 17, the control section 11 can determine the photographing direction of the image pickup section 12. Note that, with respect to information relating to the photographing direction of the image pickup section 12 also, the control section 11 is configured to output the information to a control section 31 of the smartphone 30 as photographing information.

An image feature extracting section 18 is also provided in the camera 10. The image feature extracting section 18 is configured to be capable of extracting an image feature of an image that the image pickup section 12 acquired, and supplying the extraction result to the control section 11. The control section 11 is configured to be capable of transferring information regarding the extracted image feature to the smartphone 30 through the first communication section 13a.

It is possible for the first communication section 13a to communicate via a predetermined transmission path with the first communication section 33a provided in the smartphone 30. Further, it is possible for the second communication section 13b to communicate via a predetermined transmission path with the second communication section 33b provided in the smartphone 30.

The control section 11 is configured so that, when communication with the smartphone 30 is established through the second communication sections 13b and 33b, photographing can be controlled according to control by the control section 31 of the smartphone 30, and the control section 11 can transfer various kinds of information relating to photographing (photographing information) to the smartphone 30. Further, the control section 11 is configured so that, when communication with the smartphone 30 is established through the second communication sections 13b and 33b, the control section 11 can transfer a picked-up image that the image pickup section 12 acquired to the smartphone 30.

A control section 21 is provided in the recorder 20 that is an external device. The control section 21 may be constituted, for example, by a processor that uses a CPU or the like and may control each section by operating in accordance with a program stored in an unshown memory, and a part of the control section 21 may be replaced by an electronic circuit including hardware. The control section 21 controls each section of the recorder 20.

An ST (stereo) sound collection section 22 is provided in the recorder 20. The ST sound collection section 22 is configured to be capable of collecting ambient sounds by means of the microphones 22L, 22R and 22C that are exposed to outside of the case 20a and supplying audio signals to the control section 21.

An operation section 25 is also provided in the recorder 20. The operation section 25 provides an operation signal that is based on a user operation to the control section 21. The control section 21 is configured to be also capable of controlling each section of the recorder 20 based on an operation signal from the operation section 25. A clock section 26 is also provided in the recorder 20. The clock section 26 is configured to supply time information to the control section 21.

A sound collection control section 21a can subject an audio signal that is acquired by means of the ST sound collection section 22 by collecting sounds to predetermined signal processing, and thereafter supply the resulting audio signal to the recording section 24 to record the audio signal. For example, an IC memory can be used as the recording section 24. The control section 21 is configured to be also capable of transferring collected audio signals to the smartphone 30 through the second communication section 23b.

In the present embodiment, the recording section 24 includes a co-operation information section 24a configured to record information relating to the co-operation with the co-operating smartphone 30.

The sound collection control section 21a also controls a beam forming section 21b. The beam forming section 21b is controlled by the sound collection control section 21a and is capable of controlling the directivity at the ST sound collection section 22. That is, the beam forming section 21b is configured to be capable of performing control with respect to an output audio signal of the ST sound collection section 22 so that the direction (hereunder, referred to as "beam direction") of the output audio signal is one in which the sensitivity is highest. Note that the control section 21 may be configured to output information relating to the beam direction to the control section 31 of the smartphone 30.

It is possible for the first communication section 23a to communicate via a predetermined transmission path with the first communication section 33a provided in the smartphone 30. Further, it is possible for the second communication section 23b to communicate via a predetermined transmission section 33b provided in the smartphone 30.

The control section 21 is configured so that, when communication with the smartphone 30 is established through the first communication sections 23a and 33a, collection of sounds is controlled according to control by the control section 31 of the smartphone 30, and the control section 21 can transfer various kinds of information relating to sound collection (sound collection information) to the smartphone 30. Further, the control section 21 is configured so that, when communication with the smartphone 30 is established through the second communication sections 23b and 33b, the control section 21 can transfer an audio signal that the ST sound collection section 22 acquired to the smartphone 30.

The control section 31 is provided in the smartphone 30 that is an information terminal apparatus. The control section 31 may be constituted, for example, by a processor that uses a CPU or the like and may control each section by operating in accordance with a program stored in an unshown memory, and a part of the control section 31 may be replaced by an electronic circuit including hardware. The control section 31 controls each section of the smartphone 30. The control section 31 is configured to send a driving control signal for driving image pickup device to the control section 11 of the camera 10 through the first communication sections 33a and 13a, and to receive photographing information sent from the control section 11. The control section 31 also receives picked-up images from the camera 10 through the second communication sections 33b and 13b.

Further, the control section 31 is configured to send a control signal for controlling the collection of sounds to the control section 21 of the recorder 20 through the first communication sections 33a and 23a, and to receive information relating to the beam direction that is sent from the control section 21. The control section 31 also receives audio signals from the recorder 20 through the second communication sections 33b and 23b.

In the present embodiment, a built-in surface camera section 32 as a function realizing section is provided in the smartphone 30. An unshown image pickup device constituted by a CCD, a CMOS sensor or the like is provided in the built-in surface camera section 32. The built-in surface camera section 32 is configured so that an object optical image that is incident through a lens 32a provided in the case 30a is incident on an image pickup surface of the image pickup device. The built-in surface camera section 32 is controlled by the control section 31 to pick up an image of an object and can output the picked-up image to the control section 31. The control section 31 is configured to be capable of performing various kinds of photographing control such as focusing control, exposure control, white balance control and angle of view control when the built-in surface camera section 32 is picking up an image.

A built-in sound collection section 37 is also provided as a function realizing section in the smartphone 30. The built-in sound collection section 37 includes microphones 37aL and 37aR (see FIG. 5) that are provided at an end portion on the rear face side of the case 30a. The built-in sound collection section 37 is controlled by the control section 31 and can collect ambient sounds by means of the microphones 37aL and 37aR, and output audio signals to the control section 31. The control section 31 may be configured to be capable of adjusting the direction of a beam formed by beam forming when the built-in sound collection section 37 collects sounds.

Note that although in FIG. 1 an example is illustrated in which the built-in sound collection section 37 uses a stereo microphone, the built-in sound collection section 37 may use a monaural microphone. Further, although in FIG. 2 an example is illustrated in which the microphones 37aL and 37aR are disposed at both ends of the case 30a, the microphones 37aL and 37aR may be disposed at any position on the case 30a.

The control section 31 performs predetermined signal processing, for example, color adjustment processing, matrix conversion processing, noise elimination processing as well as various other kinds of signal processing on a picked-up image received through the second communication section 33b (hereunder, also referred to as an "external camera image") and a picked-up image from the built-in surface camera section 32 (hereunder, also referred to as an "internal camera image"). Further, the control section 31 performs predetermined signal processing on an audio signal received through the second communication section 33b (hereunder, also referred to as "externally collected sound") and an audio signal from the built-in sound collection section 37 (hereunder, also referred to as "internally collected sound").

The control section 31 can perform processing relating to recording and playback of picked-up images and audio signals. For example, the control section 31 can subject photographed images and audio signals that have undergone signal processing to compression processing and can provide the compressed images and audio signals to a recording section 34 to cause the recording section 34 to record the compressed images and audio signals. Various kinds of recording media, for example, an IC memory, can be adopted as the recording section 34, and the recording section 34 is capable of recording image information and audio information or the like on a recording medium.

A display control section 38 executes various kinds of display-related processing. The display control section 38 receives a photographed image after the photographed image has undergone signal processing from the control section 31, and can provide the photographed image to a display section 39 to cause the display section 39 to display the image. The display section 39 includes a display screen 39a (see FIG. 5) such as an LCD and displays an image received from the display control section 38. The display control section 38 is configured to be also capable of causing various kinds of menu displays and the like to be displayed on the display screen 39a of the display section 39. The control section 31 can read out a picked-up image that is recorded in the recording section 34, and subject the picked-up image to expansion processing. The display control section 38 can supply the picked-up image that underwent expansion processing to the display section 39 to thereby enable playback of a recorded image.

An operation section 35 is also arranged in the smartphone 30. The operation section 35 as an input section for built-in function activation is constituted by various kinds of operation sections such as unshown switches, keys and a software keyboard that are provided in the smartphone 30. The operation section 35 is configured to generate operation signals based on user operations, and output the operation signals to the control section 31. The control section 31 controls each section based on the operation signals.

An unshown touch panel is also provided as the operation section 35 on the display screen 39a of the display section 39. The touch panel can generate an operation signal corresponding to a position on the display screen 39a that a user indicates using a finger. The operation signal is supplied to the control section 31. Thus, the control section 31 is configured so that when a user touches or slides a finger on the display screen 39a, the control section 31 can detect a position that the user touches, and can also detect various operations such as an operation in which the user brings fingers close together and then separates the fingers (a pinching operation), a slide operation and a position reached by the slide operation, a slide direction and the duration of a touch operation, and can execute processing corresponding to the user operation.

Note that the display screen 39a is arranged so as to occupy, for example, almost the entire area of the front face of the case 30a of the smartphone 30, and the user can check a picked-up image that is displayed on the display screen 39a of the display section 39 during photographing by the built-in surface camera section 32 and can perform a photographing operation while checking the picked-up image.

In the present embodiment, the control section 31 is configured to be capable of performing operations in a co-operation mode in which various kinds of functions are realized by co-operating with respective external devices. In the present embodiment, a configuration is devised whereby it is determined in advance which functions that are utilized by external devices can be assisted by which internal functions of the smartphone 30. That is, a by-function guide section 34a that is a substitution database showing which internal functions can be substituted in correspondence with external devices is provided in the recording section 34. The by-function guide section 34a may be configured so as to allow writing thereto by application software that controls an external device or the like. Further, information transmitted through the first communication section 33a may be recorded in the by-function guide section 34a in association with information of the by-function guide section 34a.

In the present embodiment, the control section 31 is configured so as to cause information that is necessary for co-operation to be transferred to and recorded by the co-operation information sections 14a and 24a of the camera 10 and the recorder 20 that are external devices based on information of the by-function guide section 34a. The control section 11 of the camera 10 controls each section in accordance with the information for co-operation that is recorded in the co-operation information section 14a. Further, the control section 21 of the recorder 20 controls each section in accordance with the information for co-operation that is recorded in the co-operation information section 24a.

For example, the control section 31 compares the functions of the smartphone 30 and the functions of the external device, and in a case where the smartphone 30 has a function (hereunder, referred to as "substitutional function") that is a same as a function to be performed by the co-operating external device, the control section 31 selects whether to use the substitutional function of the smartphone 30 or to use the function of the external device based on information of the by-function guide section 34a, and performs settings and the like with respect to the external device in the case of implementing the function of the external device.

In general, in many cases the power of the smartphone 30 is turned on at all times and applications are in an activated state or an activation standby state, and it is possible for the built-in surface camera section 32 and the built-in sound collection section 37 to pick up images or collect sounds immediately after a user performs an operation for moving image photographing of the like. In contrast, although the image pickup performance and sound collection performance of the camera 10 and the recorder 20 that are external devices are generally superior to the smartphone 30, predetermined settings are necessary in order to acquire images or sounds that the user desires. For example, in order to acquire a favorable image with the camera 10, it is better to carefully set up the camera including arranging the placement and orientation of the camera as well as setting the focus adjustment and angle of view adjustment of the camera. Further, with respect to the recorder 20 also, in order to acquire favorable sounds, it is better to carefully set up the recorder 20 including arranging the position and orientation as well as setting the sound-recording level and the like.

In the present embodiment, in the co-operation mode, the control section 31 is configured to first operate in a co-operation preparation mode and to subsequently transition to a main co-operation mode. In the co-operation preparation mode, by first activating predetermined applications based on information of the by-function guide section 34a while executing substitutional functions, the control section 31 transmits various kinds of setting information to the external devices through the first communication sections 33a, 13a and 23a to cause the camera 10 and the recorder 20 to sequentially execute various kinds of settings. In the co-operation preparation mode, the control section 31 confirms that desired images and sounds are obtained as a result of the settings made by the external devices, by means of information transmitted through the second communication sections 33b, 13b and 13b. For example, the control section 31 may determine whether a desired image and a desired sound were obtained depending on whether an external camera image range and a sound collection range that are described later are within a predetermined range, respectively, or, for example, the control section 31 may determine whether a desired image and a desired sound were obtained depending on whether or not an external camera image is in a focused state and whether or not a collected sound level is within a predetermined range.

If the control section 31 determines in the co-operation preparation mode that a desired image and a desired sound or the like were obtained, the control section 31 determines that co-operation may be started and therefore transitions to the main co-operation mode and executes switching from the substitutional functions to the functions of the external devices. Note that the control section 31 may also be configured so that, after switching to the functions of the external devices, the control section 31 also simultaneously executes the substitutional functions. Further, the control section 31 may be configured so that, while operating in the main co-operation mode also, depending on a judgement result regarding the quality of received information or an instruction of the user or the like, where appropriate the control section 31 transitions to the co-operation preparation mode to perform resetting with respect to the external devices.

Note that the control section 31 may be configured to perform switching to a function of an external device by taking a fact that communication by means of the first communication sections 33a, 13a and 23a and the second communication sections 33b, 13b and 23b is established as indicating that preparations for switching from a substitutional function to the function of the external device are completed.

The smartphone 30 includes an image feature extracting section 40a and a sound feature extracting section 40b. The image feature extracting section 40a is configured to be capable of extracting image features of an external camera image and an internal camera image, and supplying the extraction results to the control section 31. Note that the control section 31 may also receive image features with respect to an external camera image from the camera 10. In this case, processing to extract image features of the external camera image at the image feature extracting section 40a can be omitted. The control section 31 is configured to be capable of determining the range of an image portion of an external camera image (hereunder, also referred to as "external camera image range") in an internal camera image by means of inputted image feature information.

The sound feature extracting section 40b is configured to be capable of extracting sound features of externally collected sounds and internally collected sounds, and supplying the extraction results to the control section 31. Note that the control section 31 may also receive sound features with respect to an externally collected sound from the recorder 20. In this case, processing to extract sound features of the externally collected sound at the sound feature extracting section 40b can be omitted. The control section 31 is configured to be capable of determining a sound collection range of an externally collected sound by means of two pieces of sound feature information as well as image feature information that were inputted.

For example, the control section 31 may determine the sound collection range of an externally collected sound by adopting waveform or frequency analysis results as sound features of an internally collected sound that was collected by the built-in sound collection section 37 and an externally collected sound and performing a comparison between the two results that are obtained or the like. The control section 31 may also be configured to calculate beam forming information for positioning the sound collection range at a predetermined position at the center of an image or the like based on a determined result regarding a sound collection range of the externally collected sound, and transmit the beam forming information to the recorder 20.

In the embodiment, the control section 31 is configured to be capable of displaying a display showing a determined sound collection range for externally collected sounds, that is, a sound collection range of the ST sound collection section 22 of the recorder 20 in an internal camera image or an external camera image.

Figure 4:
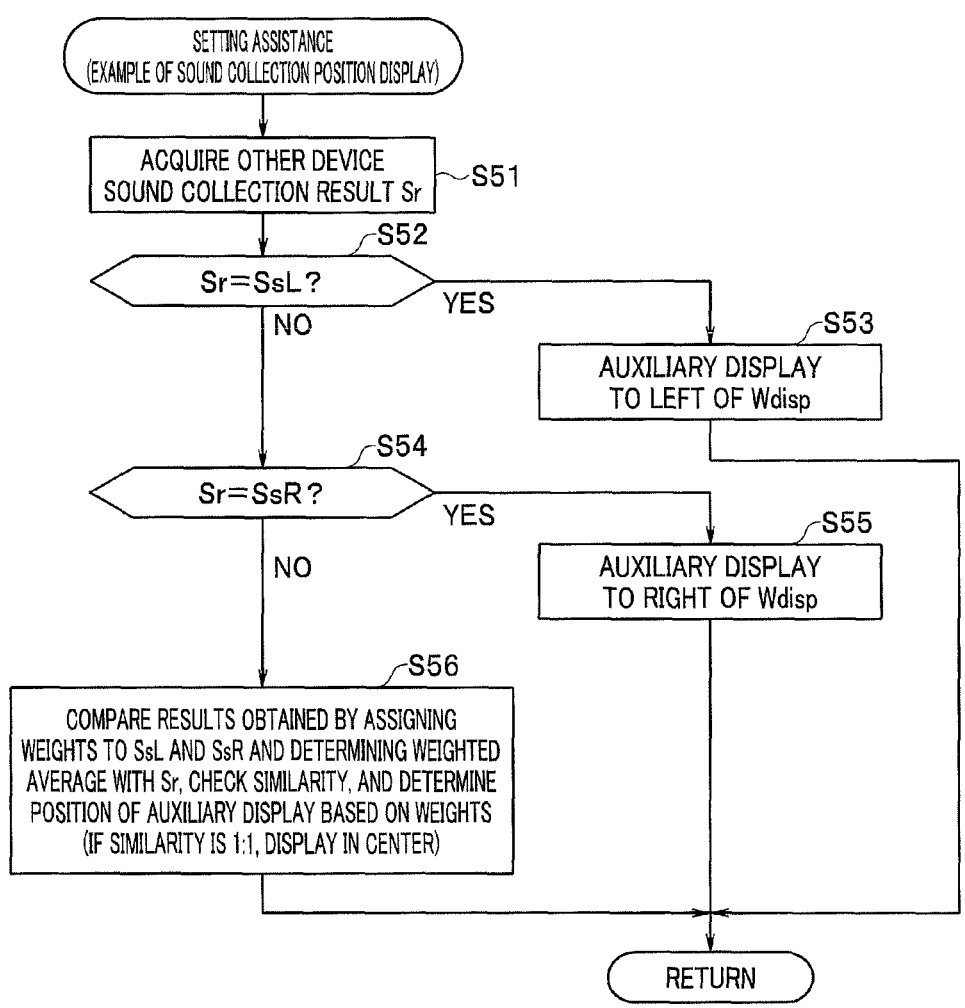
FIG. 4 is a flowchart for describing a method for determining a sound collection range.
Figure 5:
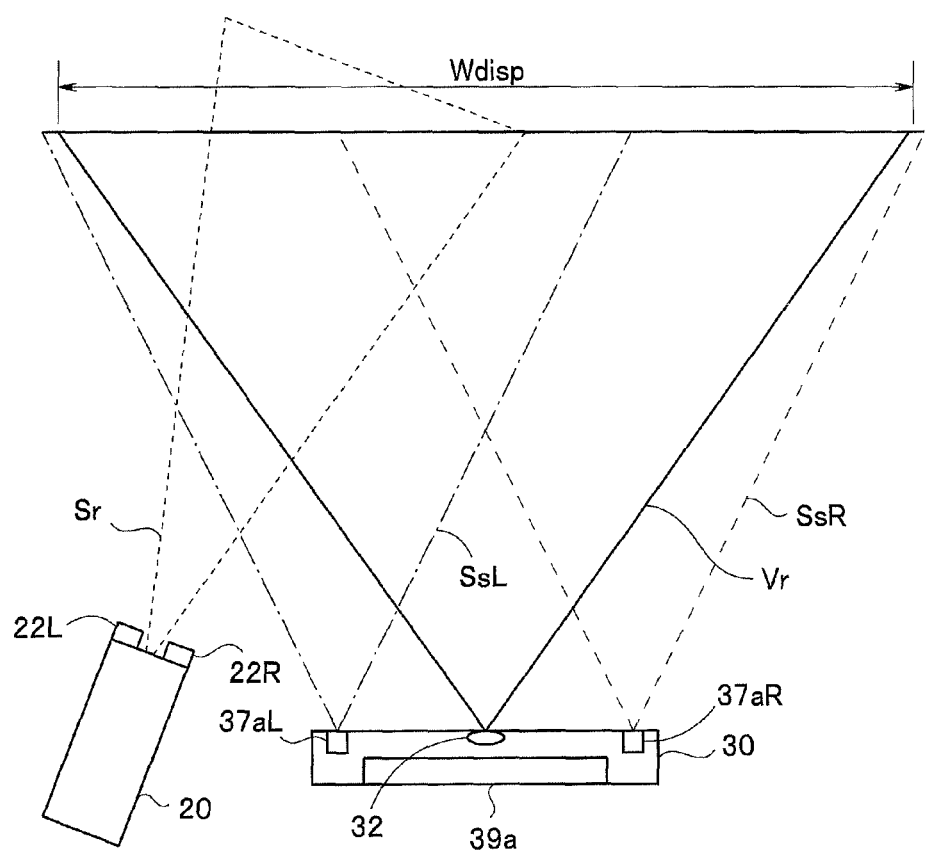
FIG. 5 is an explanatory diagram for describing a method for determining a sound collection range.

FIG. 4 is a flowchart for describing a method for determining a sound collection range. FIG. 5 is an explanatory diagram for describing a method for determining a sound collection range.

FIG. 5 illustrates an example of a case where an unshown sound collection target (for example, a plurality of performers) is located at a position at which an image pickup range at an angle of view Vr obtained by the built-in surface camera section 32 of the smartphone 30 is Wdisp. In the built-in sound collection section 37 of the smartphone 30, the left microphone 37aL and the right microphone 37aR are arranged at positions corresponding to the openings 37L and 37R (see FIG. 2) of the case 30a, respectively. The left microphone 37aL collects sounds in a sound collection range indicated by alternate long and short dashed lines to thereby acquire internally collected sound SsL. The right microphone 37aR collects sounds in a sound collection range indicated by dashed lines to thereby acquire internally collected sound SsR. Further, the recorder 20 collects sound in a sound collection range indicated by dashed lines by means of the left and right microphones 22L and 22R to thereby acquire externally collected sound Sr.

In step S51 in FIG. 4, the control section 31 of the smartphone 30, for example, acquires the externally collected sound Sr of the recorder 20 by receiving the externally collected sound Sr through the second communication section 33b. In step S52, the control section 31 performs, for example, a waveform comparison between the externally collected sound from the recorder 20 and the sound collected by the left microphone 37aL and determines whether the externally collected sound Sr and the internally collected sound SsL approximately match. Further, in step S54, the control section 31 performs, for example, a waveform comparison between the externally collected sound Sr from the recorder 20 and the sound collected by the right microphone 37aR and determines whether the externally collected sound Sr and the internally collected sound SsR approximately match.

If the control section 31 determines in step S52 that the externally collected sound Sr and the internally collected sound SsL approximately match, in the next step S53 the control section 31 displays an auxiliary display showing the sound collection range at a screen position corresponding to a position on the left side of the image pickup range Wdisp of the built-in surface camera section 32. Further, if the control section 31 determines in step S54 that the externally collected sound Sr and the internally collected sound SsR approximately match, in the next step S55 the control section 31 displays an auxiliary display showing the sound collection range at a screen position corresponding to a position on the right side of the image pickup range Wdisp of the built-in surface camera section 32.

If the result of the determination by the control section 31 in step S52 and step S54 is "No", the control section 31 advances the processing to the next step S56. In step S56, the control section 31 assigns weights to the internally collected sound SsL from the left microphone 37aL and the internally collected sound SsR from the right microphone 37aR, respectively, and determines the weighted average. The control section 31 checks the similarity between weighted average results and the externally collected sound Sr while changing the ratio between the weights and decides the position of the auxiliary display according to the ratio between weights for which the highest similarity is obtained. For example, when the similarity becomes highest in a case where the ratio between the weights is 1:1, the control section 31 displays the auxiliary display at a screen position corresponding to the center position of the image pickup range Wdisp.

Figure 6A:
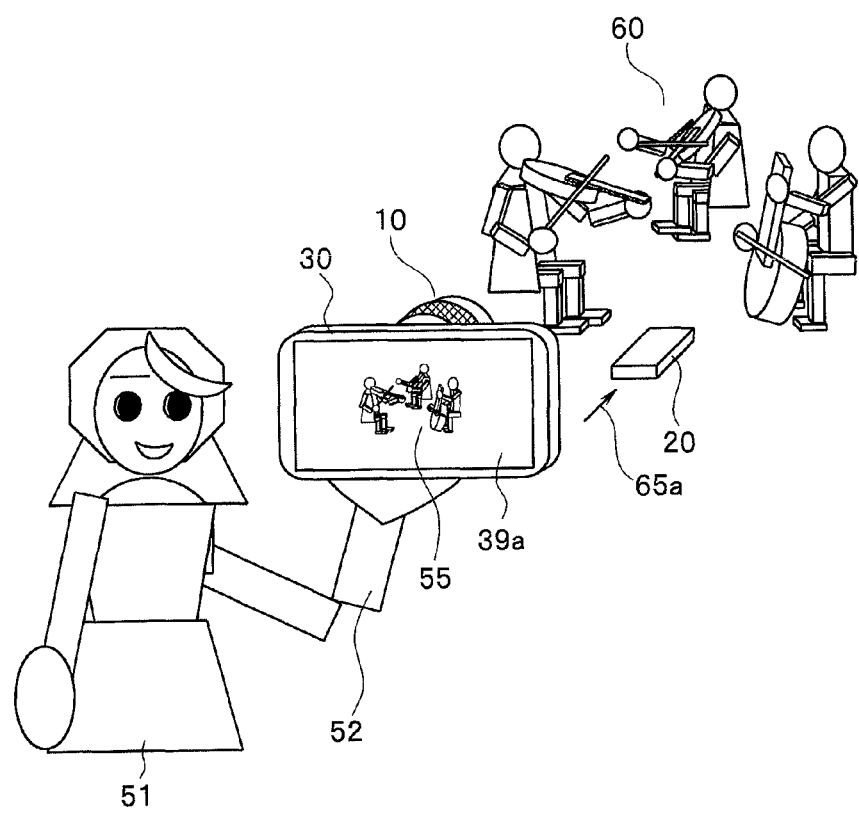
FIG. 6A is an explanatory diagram illustrating a state in which photographing is performed.
Figure 6B:
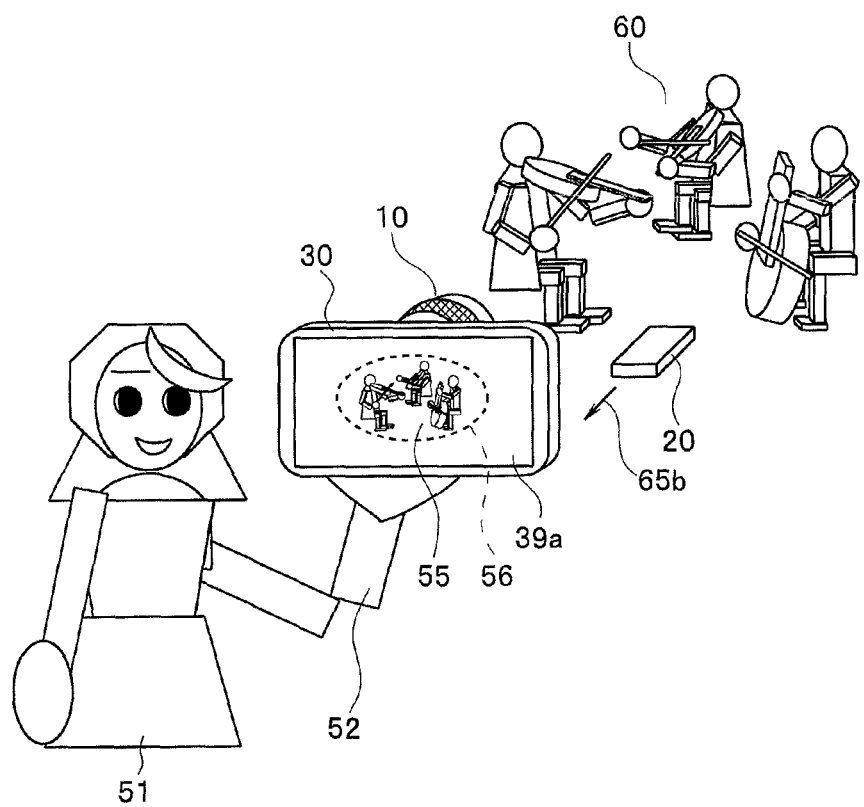
FIG. 6B is an explanatory diagram illustrating a state in which photographing is performed.
Figure 6C:
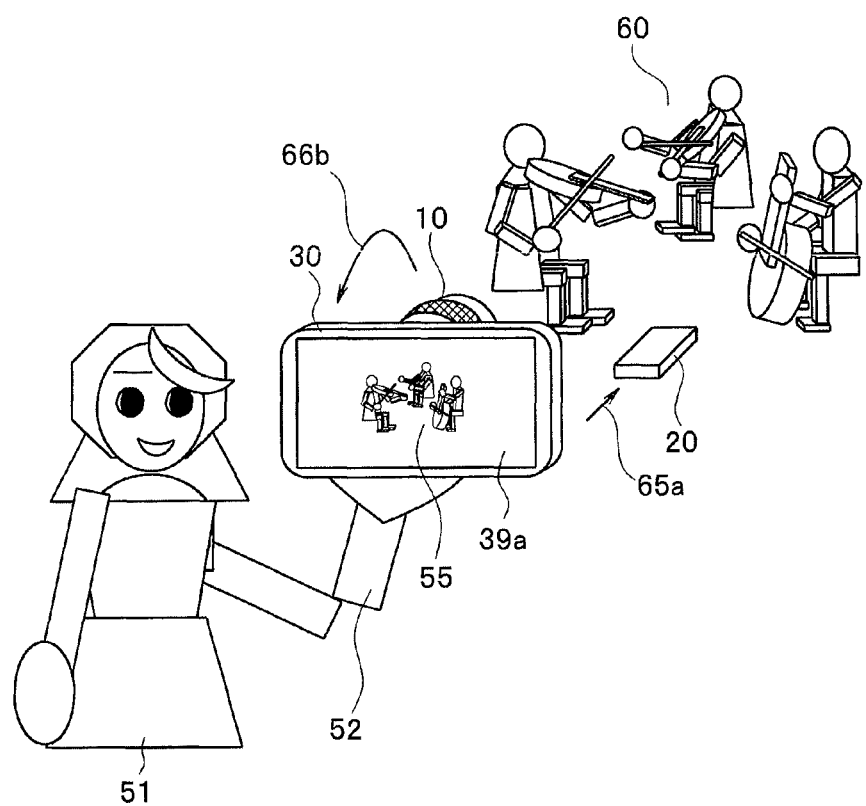
FIG. 6C is an explanatory diagram illustrating a state in which photographing is performed.
Figure 7:
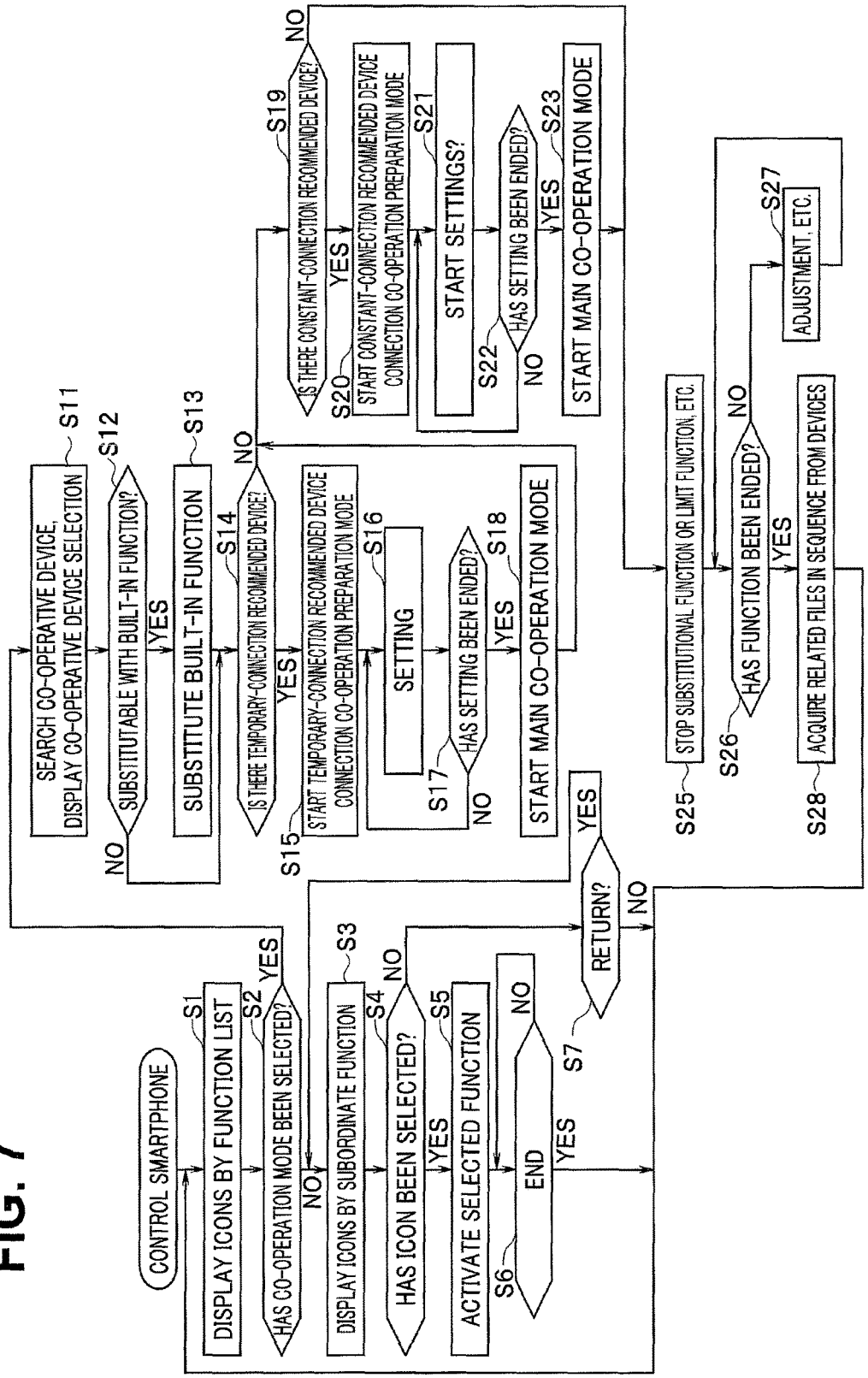
FIG. 7 is a flowchart illustrating control (smartphone control) by the smartphone 30.

Next, the operations of the embodiment configured as described above will be described with reference to FIG. 6A to FIG. 10. FIG. 6A to FIG. 6C are explanatory diagrams illustrating states in which photographing is performed. FIG. 7 is a flowchart illustrating control (smartphone control) performed by the smartphone 30. FIG. 8 is a flowchart illustrating control of a co-operative device. FIG. 9A to FIG. 9E are explanatory diagrams illustrating screen displays of the smartphone 30, that show examples of a display on the display screen 39a of the display section 39.

A photographer 51 mounts the lens-type camera 10 on the mounting tool 41 that is attached to the smartphone 30. The state is illustrated in FIG. 6A to FIG. 6C. The photographer 51, for example, grasps the case 30a of the smartphone 30 and the lens barrel 43 in their left hand 52 and performs, for example, moving image photographing, in a state in which an object 60 is captured in the field of view range while looking at a through image 55 that is displayed on the display screen 39a of the display section 39. Note that, in FIG. 6A to FIG. 6C, an example is illustrated in which the object 60 is three performing musicians playing musical instruments, and the sound of the musical performance by the three musicians is being collected by the recorder 20 that is placed at a position that is at a predetermined distance from the performing musicians.

The camera 10 is capable of obtaining an object image of higher quality than the smartphone 30. Further, although in FIG. 6A to FIG. 6C an example is illustrated in which the lens-type camera 10 that is mounted to the smartphone 30 is adopted, in the case of adopting a common digital camera or the like as the camera 10, it is also possible to fixedly dispose the camera 10 by means of a tripod or the like. Although the smartphone 30 is held by the user and sometimes the position of the smartphone 30 relative to the object 60 is limited, in some cases the camera 10 that is fixed to a tripod or the like can be placed at a position that is favorable for photographing the object 60, and thus acquisition of a more ideal image is possible.

The recorder 20 is capable of collecting sounds of higher quality than the smartphone 30. With regard to the recorder 20 also, it is relatively simple to place the recorder 20 at an ideal position for sound recording with respect to the object 60, and it is possible to acquire more ideal sounds than when recording with the smartphone 30.

However, although theoretically the above may true, at the actual usage scene the position of the tripod to which the camera 10 is fixed may be shifted, or a noise source may come close to the recorder 20 which was placed at what should have been a suitable position, and consequently in some cases the smartphone 30 which is being held that can carefully adapt to the circumstances. Thus, since the realization of functions by co-operation does not necessarily always proceed as desired, a configuration may be adopted in which the smartphone 30 simultaneously activates the same functions, and a decision can be made to adopt or reject the obtained results afterwards. That is, the smartphone 30 in the case includes a function realizing section that realizes one or more substitutional functions, and it is assumed that one or more co-operative external devices exist, and the smartphone 30 includes a communication section that performs communication with the co-operative external devices. Although in the co-operation mode a case is assumed in which the co-operation preparation mode is executed that performs settings relating to a predetermined function of the aforementioned external devices through the communication sections while causing the substitutional functions of the function realizing section to be realized, in a case where it is not known whether the result achieved by co-operation with the external device is good from beginning to end, such as when screen switching is performed during a moving image, both images are sometimes required. Therefore, the control section is provided that enables co-operative recording and co-operative playback of information from external devices obtained by communication sections, and information acquired by the aforementioned built-in functions. However, since in many cases the co-operation proceeds as desired, the control section may perform control to transition to the main co-operation mode that causes the predetermined functions of the external devices to be implemented after the co-operation preparation mode ends.

(Smartphone Control)

Figure 9A:
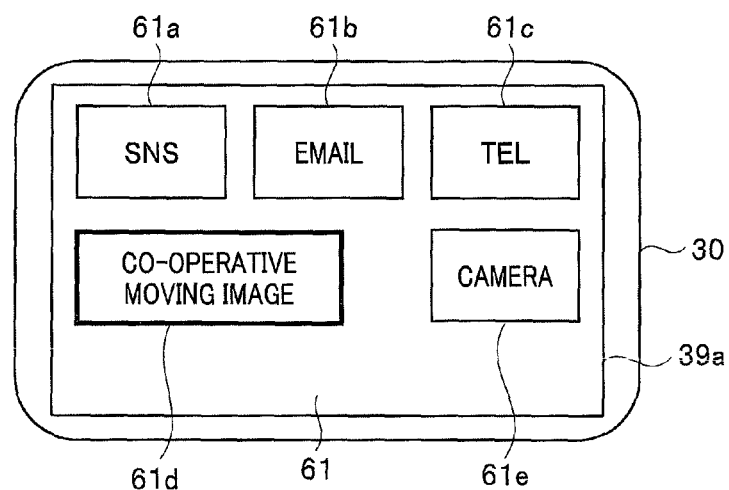
FIG. 9A is an explanatory diagram illustrating a screen display of the smartphone 30.

In step S1 in FIG. 7, the control section 31 of the smartphone 30 displays a list of icons by function. FIG. 9A illustrates an example of a by-function list display 61 on the display screen 39a of the smartphone 30 in the case. The by-function list display 61 that is displayed on the display screen 39a includes an icon 61a for selecting an SNS mode, an icon 61b for selecting an email mode, an icon 61c for selecting a phone mode, an icon 61e for selecting a camera mode, and an icon 61d for specifying a co-operation mode (co-operative moving image).

In the next step S2, the control section 31 determines whether or not a function selected by the user is the co-operation mode. If a mode other than the co-operation mode is selected, the control section 31 displays icons (not shown in the drawing) of subordinate functions that correspond to the selected mode (step S3). The control section 31 determines whether or not an icon of a subordinate function is selected (step S4), and if an icon is selected, the control section 31 activates the function that corresponds to the selected icon (step S5).

Next, in step S6, the control section 31 determines whether or not an operation to end the activated function is performed, and repeats the determination in step S6 until an operation to end the activated function is performed. When an operation to end the activated function is performed, the control section 31 returns the processing to step S1. Note that, in a case where an icon is not selected in step S4, the control section 31 advances the processing to step S7 to determine whether a return operation is performed. If a return operation is performed, the control section 31 returns the processing to step S3, and if a return operation is not performed, the control section 31 returns the processing to step S1.

It will now be assumed that the user performs a tap operation on the icon 61d for the co-operation mode on the by-function list display 61. Thus, the control section 31 determines that the co-operation mode was specified in step S2 and advances the processing to step S11. Note that, in order to show the selected mode, the display control section 38 displays the icon 61d differently to the other icons. In the example in FIG. 9A, a solid-line frame that surrounds respective icons shows modes that are not selected, and the selected mode is shown by means of a thick-line frame. In the example in FIG. 9A, it is shown that the co-operation mode is selected.

In the co-operation mode, first, by communication through the first communication section 33a (hereunder, referred to as "first communication"), the control section 31 searches for an external device that is a co-operation target (hereunder, referred to as "co-operative device") that is capable of co-operating with the smartphone 30, based on information of the by-function guide section 34a. Next, in step S12, based on information of the by-function guide section 34a, the control section 31 determines whether or not it is possible to substitute a built-in function of the smartphone 30 for a function of the co-operative device, and if substitution is possible the control section 31 substitutes the built-in function (that is, substitutional function) for the function of the co-operative device (step S13), and advances the processing to step S14. Note that, in a case where the co-operating external device is a camera or a recorder, the substitutional functions are mainly a function that acquires a sound or an image, and a function that records or displays the acquired sound or image.

That is, in the present embodiment, when a tap operation is performed on the icon 61d, substitutional functions that the smartphone 30 includes are automatically activated. Note that a configuration may also be adopted in which, even in a case where substitutional functions exist, the user explicitly activates a substitutional function by performing an operation on the operation section 35. The user may also activate additional functions and not only substitutional functions. For example, in the case of acquiring images of a concert, in some cases a user may use a function of the smartphone 30 to access a server or the like on which information such as the musical program or the instrumentalists who are playing at the time in question is recorded, to thereby acquire such information. An accessible server may convey such information to the smartphone, or the smartphone may send an inquiry to the effect to a server or the like, and the server or the like may search for the relevant information. If communication by the first communication is possible, a co-operative device may perform processing to return the name or ID of the co-operative device to the communication counterpart. By this means, upon seeing the name or ID, the smartphone side, for example, refers to the database inside the recording section or the like to determine whether or not it is worthwhile to co-operate with the device in question. However, since sometimes mistakes and failures with respect to the operations, settings and decisions on the smartphone side exist, a configuration may also be adopted in which the co-operative device side transmits information that assists the determination regarding whether co-operation is worthwhile by transmitting information regarding the performance and the like of the co-operative device to thereby attempt to make co-operation with the co-operative device appealing to the smartphone. Further, a configuration may be adopted in which not all selections regarding whether to reject or adopt co-operation and required information are entrusted to the smartphone side, and instead the control section on the co-operating external device side determines the necessity for co-operation and starts the co-operation. By adopting such a contrivance, it is possible for acquisition of information that failed at the smartphone to be performed instead by the co-operative device, to thereby make the co-operating process fail-safe and provide a measure that prevents failures. Since also some devices, with respect to which even if the fundamental performance as a co-operative device is good, do not produce performance that is appropriate for the required co-operation depending on the environment or the like, the combined use of control to cause information that can be acquired to be sent as a trial may also be adopted. The smartphone side then determines whether to conduct co-operation upon checking the information that is sent as the trial. For example, a user interface may also be provided that allows sound to be played back for comparison to allow the user to choose whether to conduct co-operation. In addition, information such as the remaining amount of the battery of the external device (co-operative device) or the time period for which co-operation is sustainable, or information regarding busy processing in a case where access is also performed from another device and the like may be acquired at the time and used to determine whether to conduct co-operation, and the user may also make a setting to shorten the co-operation time period or carry out negotiations with respect to the external device. In a case where a corresponding substitutional function does not exist in the smartphone 30, the control section 31 advances the processing from step S12 to step S14.

In this connection, the co-operative devices include external devices with which communication and settings for co-operating need only be performed temporarily (hereunder, referred to as "temporary-connection recommended device"), and external devices with which it is better to constantly communicate and connect with for the co-operation (constant-connection recommended device). For example, with respect to picked-up images of an object, during the performance by the object 60, constantly displaying an image on the smartphone 30 is effective from the viewpoint of checking the image pickup state and the like, and it is better to constantly perform communication and be connected in order to transfer the images. That is, the camera 10 is thus a constant-connection recommended device. On the other hand, with respect to the sound, it is not almost needed to simultaneously listen to the collected sound while listening to a live performance by the object 60. Therefore, it is not necessary to constantly transmit collected sounds, and the recorder 20 is thus a temporary-connection recommended device.

When taking into consideration the limitations with regard to transmission, among the co-operating external devices, it is good to first connect to and perform settings for a temporary-connection recommended device, and after performing settings of the temporary-connection recommended device, to then perform settings for a constant-connection recommended device. Therefore, in step S14, the control section 31 first determines whether or not a temporary-connection recommended device exists as a co-operative device based on the information of the by-function guide section 34a. If a temporary-connection recommended device does not exist, in the next step S19 the control section 31 determines whether or not a constant-connection recommended device exists based on the information of the by-function guide section 34a.

If the control section 31 determines in step S14 that a temporary-connection recommended device exists, the control section 31 starts communication with the temporary-connection recommended device by means of the first communication. Note that, in step S11, the control section 31 displays a co-operative device selection display as illustrated in FIG. 9B to allow the user to select a co-operative device to connect to.

Figure 9B:
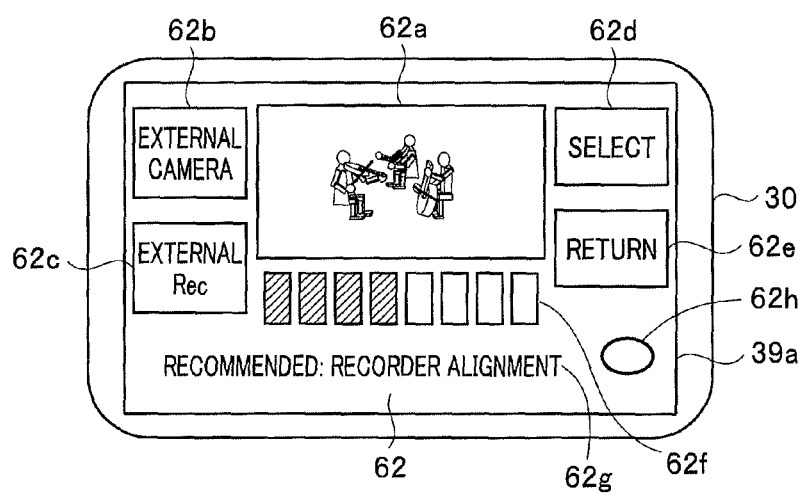
FIG. 9B is an explanatory diagram illustrating a screen display of the smartphone 30.

FIG. 9B illustrates an example of a co-operative device selection display 62. The co-operative device selection display 62 that is displayed on the display screen 39a includes: a region 62a in which an object is displayed by means of an internal camera image; a button 62b for specifying an external camera; a button 62c for specifying an external recorder (Rec); a select button 62d for confirming selection of a co-operative device; a return button 62e; a level display 62f for showing a recording level of internally collected sound; a message display 62g for showing a setting that is recommended for the selected co-operative device; and a one-touch button 62h for executing the setting shown in the message display 62g with a single touch.

The buttons 62b and 62c are buttons that show devices that are selected as co-operative devices and are also buttons for allowing selection of a co-operative device by the user. The user can select the camera 10 that is a constant-connection recommended device by operating the button 62b and can select the recorder 20 that is a temporary-connection recommended device by operating the button 62c.

In step S14, if a co-operative device that was found by performing a search operation is a temporary-connection recommended device, the control section 31 causes the display to show that the button 62c is selected. Note that, in a case where only a constant-connection recommended device exists, the display shows that the button 62b is selected.

When the user performs an operation on the select button 62d, the control section 31 confirms the selection of the external device that is selected and transitions to the co-operation preparation mode (step S15). Note that, at the stage, the function of the external device is not being utilized, and an internal camera image is displayed in the region 62a, and the level display 62f shows the recording level of internally collected sound.

Further, information regarding recommended settings with respect to the co-operative device that is selected is displayed by means of the message display 62g, and the one-touch button 62h is a button for executing the recommended settings with a single touch.

Figure 9C:
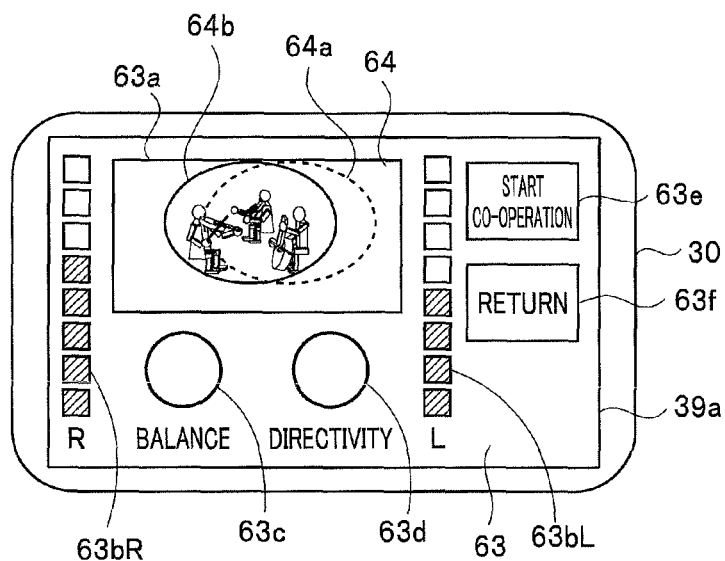
FIG. 9C is an explanatory diagram illustrating a screen display of the smartphone 30.

A situation will now be assumed in which the user taps the select button 62d in a state in which the recorder 20 is being selected as an external device. Upon the select button 62d being tapped, the control section 31 sets the co-operation preparation mode and displays a co-operation preparation mode display. FIG. 9C illustrates a co-operation preparation mode display 63 in a case where the recorder 20 was selected. At the time, the type of co-operation to perform may be automatically selected or may be manually selected from devices displayed in a list on the display section. If a plurality of candidates exist, a configuration may be adopted that can display a comparison of the performance of the respective candidates or that can acquire information by trial operations and compare the acquired information, to thereby assist the selection by the user. A user interface for selection is provided and an audio instruction or the like is issued to instruct the user to make a manual selection. Automation of user selections can also be achieved by means of machine learning or the like by accumulating and learning the results of such user selections according to the circumstances at the time of each selection (a determination can be made based on information such as whether the selection relates to an image or a sound, as well as the date and time and the location and the like). Naturally, automatic selection may also be performed by determining and branching using a specific program. Combined use of artificial intelligence may also be adopted, and in such a case the automatic selection may utilize branching that uses an even larger number of determination items. Although making a determination may be difficult in some cases if the user is not an experienced user, a configuration may be adopted so that, while repeatedly learning results that were selected by an experienced user, machine learning is performed so that automatic selection can be used by general users.

After transitioning to the co-operation preparation mode in step S15, in step S16 the control section 31 starts to perform settings. Here, the control section 31 prepares a protocol that is required for specific devices to communicate with each other, and sends and receives predetermined data and the like for ensuring communication for device co-operation can be performed reliably. Audio signals from the recorder 20 are transferred to the smartphone 30 by communication through the second communication section 33b (hereunder, referred to as "second communication"). An arrow 65b in FIG. 6B indicates the transfer of audio data from the recorder 20 to the smartphone 30.

The control section 31 can automatically set optimal initial settings based on the information of the by-function guide section 34a. For example, the control section 31 performs settings with respect to balance adjustment and directivity (sound collection range) adjustment of the recorder 20 based on information of the by-function guide section 34a. In FIG. 9C, the sound collection range in an initial state before performing the aforementioned settings is indicated by an auxiliary display 64a shown by a dashed line, and the sound collection range after correction is indicated by an auxiliary display 64b shown by a solid line. Further, with respect to the balance adjustment, level displays 63bR and 63bL that are in accordance with the balance after correction are displayed.

If the user wishes to change the settings by performing a user operation, the user operates a balance button 63c or a directivity button 63d to specify an item that was set. For example, if the user performs a touch operation on an internal camera image 64 that is displayed in a region 63a on the screen, a display is shown in which the sound collection range is changed to the position of the touch operation by the display control section 38. If the user operates the directivity button 63d in that state, settings information for setting a sound collection range corresponding to the position on the internal camera image 64 that was specified by the touch operation is transferred to the recorder 20 by the control section 31. Further, if the user performs a touch operation at predetermined positions on the left and right level displays 63bR and 63bL, settings information is generated for setting left and right sound-recording levels that correspond to the relevant positions. If the user touches the balance button 63c in that state, information for specifying the balance in question is transferred to the recorder 20 by the control section 31. In FIG. 6A, transfer of data from the smartphone 30 to the recorder 20 is indicated by an arrow 65a.

A co-operation start button 63e is a button for confirming the setting contents and transitioning to the main co-operation mode, and for also returning to the co-operative device selection display 62 shown in FIG. 9B. In step S17, the control section 31 determines whether or not the setting operation has ended. The processing in steps S16 and S17 is repeated until the setting operation ends. If the user taps the co-operation start button 63e in the display state shown in FIG. 9C, the control section 31 confirms the settings information relating to the balance and directivity. Furthermore, as a result of the operation of the co-operation start button 63e, the recorder 20 transitions to the main co-operation mode for the operations that are performed from the time onward (step S18).

Note that, if the user operates the return button 63f, the control section 31 does not confirm the settings information, and instead transmits information for returning to the setting values that were in effect prior to transitioning to the co-operation preparation mode to the recorder 20, and then returns to the co-operative device selection display 62 (the processing is omitted from the flowchart illustrated in FIG. 7). Further, in the main co-operation mode in step S18, it is not necessary to perform communication between the smartphone 30 and the recorder 20, and the recorder 20 collects sounds according to the settings for the co-operation preparation mode.

Figure 9D:
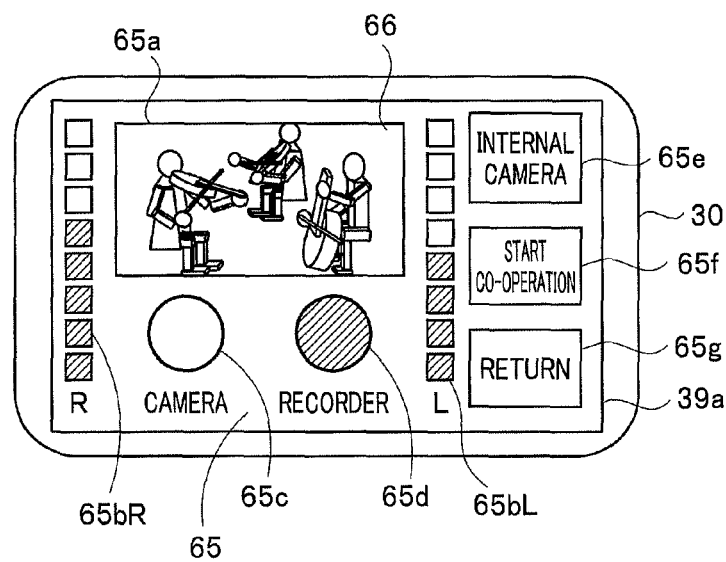
FIG. 9D is an explanatory diagram illustrating a screen display of the smartphone 30.

A case will now be assumed in which, in a state in which the co-operative device selection display 62 shown in FIG. 9B is being displayed, the external camera is selected by means of the determination in step S19 with respect to the external device search results or by an operation by the user to specify the external camera. Upon the external camera being selected, the control section 31 transitions to a co-operation preparation mode for the external camera and displays a co-operation preparation mode display 65 that is shown in FIG. 9D (step S20). On the co-operation preparation mode display 65, external devices that were transitioned to in the main co-operation mode are shown by means of a camera button 65c and a recorder button 65d. In FIG. 9D, hatching indicates that currently only the recorder 20 has transitioned to the main co-operation mode.

After transitioning to the co-operation preparation mode in step S20, in step S21 the control section 31 starts to perform settings. For example, the control section 31 automatically sets the optimal initial settings based on the information of the by-function guide section 34a. For example, the control section 31 performs settings based on the information of the by-function guide section 34a with respect to the angle of view adjustment of the camera 10 or the like. In FIG. 9D, in the region 65a, an external camera image 66 is displayed in an initial state based on information of the by-function guide section 34a. That is, a picked-up image from the camera 10 is transferred to the smartphone 30 by second communication through the second communication section 33b. An arrow 66b in FIG. 6C indicates the transfer of data for an external camera image from the camera 10 to the smartphone 30.

Note that level displays 65bR and 65bL show the level of sound collected by the recorder 20 with which co-operation has already started. If the user wishes to change the setting for the angle of view by performing a user operation, it is possible for the user to change the angle of view by, for example, performing a pinch-in or pinch-out operation on the region 65a. Further, it is possible for the user to change the display angle of view or the image recording angle of view by performing a swipe operation on the region 65a. Note that, in the case of recording or displaying only a portion of the image pickup range of the camera 10 by performing a user operation or the like, a configuration may be adopted in which an internal camera image is acquired by the built-in surface camera section 32 of the smartphone 30 and is recorded by the recording section 34. Settings information such as an angle of view that is based on a user operation is transferred to the camera 10 by the control section 31.

In step S22, the control section 31 determines whether or not settings are finished and repeats the processing of steps S21 and S22 until the settings are finished. Here, it is assumed that the user performs a tap operation on the co-operation start button 65f. Upon the user performing the tap operation, the control section 31 confirms the settings information with respect to the camera 10 and transmits the confirmed information to the camera 10. Furthermore, as a result of the operation of the co-operation start button 63e, the camera 10 transitions to the main co-operation mode for operations that are performed from the time onward (step S23).

Further, it is assumed that, in the display state shown in FIG. 9D, the user taps on the recorder button 65d. Thereupon, the control section 31 displays the co-operation preparation mode display 63 for the recorder that is shown in FIG. 9C and returns the recorder 20 to the co-operation preparation mode (the processing is not illustrated in the flowchart in FIG. 7). Further, it is assumed that, in the display state shown in FIG. 9D, the user taps on an internal camera button 65e. Thereupon, as illustrated in FIG. 9E, the control section 31 displays an internal camera image 68 in the region 65a.

Figure 9E:
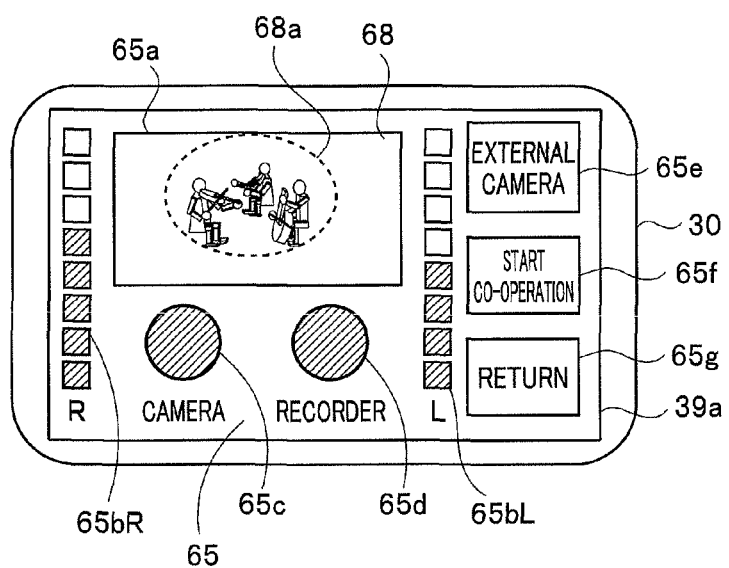
FIG. 9E is an explanatory diagram illustrating a screen display of the smartphone 30.

Note that, in the example in FIG. 9E, an auxiliary display 68a showing the sound collection range is displayed in the internal camera image 68. Further, in FIG. 9E, the user can know by means of the hatching of the camera button 65c that the camera 10 is set to the main co-operation mode. The control section 31 may also be configured to display the auxiliary display showing the sound collection range in the external camera image 66 in FIG. 9D.

If the result determined by the control section 31 in step S19 is "No" or if the control section 31 starts the main co-operation mode in step S23, next, in step S25, the control section 31 stops the substitutional functions or limits the functions. By this means the control section 31 stops the sound collection and photographing and recording functions that were being executed as substitutional functions by the smartphone 30. Note that the sound collection and photographing and recording functions include not only a case where sound collection and photographing results are recorded, but also a case where only recording of collected sounds is performed or a case where only recording of images obtained by photographing is performed. Thus, until starting operations in the main co-operation mode with the recorder 20 and the camera 10, the smartphone 30 activates substitutional functions for the functions of the devices, and in a period until desired settings are performed with respect to the recorder 20 and the camera 10 also, it is possible for the smartphone 30 to pick up images and collect sounds by means of the substitutional functions and to record and display the image pickup results and the sound collection results.

In addition, the control section 31 may be configured to continue to implement substitutional functions during the main co-operation mode also. In this case, it is possible to acquire and record information using both the smartphone 30 and the external devices. For example, it is conceivable to pick up an image of all members of the object 60 with the smartphone 30 while picking up an image of only one person among the three performing musicians of the object 60 by a zoom operation with the camera 10. In this case, not only the advantage that an image which is not picked up by the camera 10 during the co-operation preparation mode can be acquired with the smartphone 30, but also the advantage that picked-up images can be obtained by the camera 10 and the smartphone 30 in a complementary manner with respect to each other, and an image that is not obtained by one device can be acquired by the counterpart device exists. For example, as considered from the smartphone 30 side, information which the smartphone 30 failed to capture with a built-in function can be acquired and recorded by effectively utilizing the image pickup function of the camera 10.

Further, between the smartphone and an external device, it is also possible for information acquired by one of the smartphone and the external device to be attached to or supplement information that the counterpart device acquired. For example, a scene will now be assumed in which a wearable-type health device is adopted as an external device and is utilized during a marathon race. In the case, a utilization method is conceivable in which the pulse, blood pressure or the like of the user is measured by the health device while recording information regarding the speed at which the user is running by using an unshown GPS function or the like of the smartphone 30. Further, for example, in a case where a user is in the course of climbing a mountain, by using the health device to measure the pulse, blood pressure or the like of the user and record that information and using the smartphone 30 to record acquired images, a steep upward slope or the like can be determined based on the images and a change in the physical condition or the like of the user at such time can be checked.

Note that, as described above, even when in the main co-operation mode, it is not necessary for the recorder 20 to transmit data to the smartphone 30, and communication is not performed between the smartphone 30 and the recorder 20.

Next, in step S26, the control section 31 determines whether the functions at the camera 10 and the recorder 20 have ended. During a period in which the functions have not ended, in step S27, as necessary the control section 31 makes an adjustment to various kinds of settings of the camera 10 and the recorder 20. Upon determining that the functions at the camera 10 and the recorder 20 have ended, in step S28 related files and the like that should be acquired are received by the control section 31 from the co-operative devices, and the control section 31 records the files in the recording section 34. For example, the control section 31 requests the recorder 20 to transfer the recorded sound recording data, and records the sound recording data that was transferred in response to the request in the recording section 34. Further, in a case where a picked-up image from the camera 10 is not being recorded during the main co-operation mode, after the main co-operation mode ends, as necessary the control section 31 requests the camera 10 to transfer a moving image or the like that was recorded by the camera 10, and the control section 31 then records image data that was transferred in response to the request in the recording section 34.

(Co-operative Device Control)

FIG. 8 illustrates camera control of the camera 10 and recorder control of the recorder 20 that are co-operative devices.

In step S31 in FIG. 8, the control section 11 of the camera 10 and the control section 21 of the recorder 20 are in a standby state for first communication by the first communication sections 13a and 23a. In step S32, the control section 11 determines whether or not a stand-alone operation, for example, a photographing operation, was performed at the camera 10, and the control section 21 determines whether or not a stand-alone operation, for example, a sound recording operation, was performed at the recorder 20. If a photographing operation, a sound recording operation or the like is performed, the control section 11 or 21 advances the processing from step S32 to step S33 and performs control according to the operation, and thereafter returns the processing to step S31.

If the control sections 11 and 21 determine that a stand-alone operation was not performed, the control sections 11 and 21 advance the processing from step S32 to step S34 to determine whether or not the first communication occurred. If the result regarding first communication in step S34 indicates that communication by the first communication is possible, the relevant co-operative device performs processing to return the name or ID of the co-operative device to the communication counterpart. By this means, upon seeing the name or ID, the smartphone 30 side, for example, may refer to the database inside the recording section or the like to determine whether or not it is worthwhile to co-operate with the device in question, or the co-operative device side may transmit information regarding the performance and the like of the co-operative device to assist the determination on the smartphone side. Further, a configuration may be adopted in which not all selections regarding whether to reject or adopt co-operation and required information are entrusted to the smartphone 30 side, and instead the co-operative device may determine the necessity for co-operation and start the co-operation. By adopting such a contrivance, it is possible for acquisition of information that failed at the smartphone 30 to be performed instead by the co-operative device, to thereby make the co-operating process fail-safe and provide a measure that prevents failures. Some devices, with respect to which even if the performance is good, are not appropriate for the required co-operation depending on the environment or the like. For example, since in cases where a noise source is located nearby, the combined use of control to acquire the information that can be acquired in just a short time period and sends the acquired information as a trial may also be adopted. In addition, improvements are also possible that enable the notification of conditions during co-operation by transmitting information such as the remaining amount of the battery or the time period for which co-operation can be sustained. Further, since cases also arise in which the relevant external device is accessed by other devices that are different from the smartphone 30, the priority levels among the devices or busy processing or the like may be notified at the time, and negotiation may be performed. If the control section 11 or 21 does not detect the first communication, the control section 11 or 21 returns the processing to step S31. Further, if the control section 11 or 21 determines that the first communication occurred, the control section 11 or 21 advances the processing to step S35.

In step S35, the control section 11 or 21 determines whether or not the co-operation preparation mode was started. As described above, in step S15 in FIG. 7, first the control section 31 of the smartphone 30 starts the co-operation preparation mode with respect to the recorder 20 that is a temporary-connection recommended device. As a result, in step S36, the control section 21 of the recorder 20 determines whether or not the second communication is necessary. In the case of transmitting sound by the second communication to perform balance adjustment and directivity adjustment, the control section 21 starts the second communication in step S37, and in step S38 transmits an audio signal that is currently being collected to the smartphone 30 and also receives settings information or the like that is transmitted from the smartphone 30 and performs settings according to the settings information or the like.

The control section 31 of the smartphone 30 ascertains the functions and features of external devices by means of information in the by-function guide section 34a. However, in consideration of a case where information regarding the functions or features of an external device that the smartphone 30 is attempting to co-operate with is not held among the information of the by-function guide section 34a, the control sections 11 and 21 of the external devices are configured to transmit information regarding the functions or features that each external device has to the smartphone 30. The control section 31 compares the functions which the smartphone 30 has and the functions of the external devices, and with respect to identical functions or similar functions, selects the functions of the external device while actuating substitutional functions, and performs settings with respect to the relevant functions so that features that should be realized are obtained. Thus, each external device performs specified settings. For example, the control section 21 performs adjustment of the sound-recording level of the left and right microphones 22L and 22R or the like.

In step S39, the control section 21 determines whether or not the main co-operation mode was started. The control section 31 repeats the control in step S38 until the main co-operation mode is started, and when the main co-operation mode is started the control section 31 advances the processing to step S40.

On the other hand, in step S20 in FIG. 7, the control section 31 of the smartphone 30 starts the co-operation preparation mode with respect to the camera 10. When the control section 11 determines in step S35 that the co-operation preparation mode was started, in step S36 the control section 11 determines whether or not the second communication is necessary. If it is necessary to transmit an image to perform adjustment of the focus or the angle of view or the like, in step S37 the control section 11 starts the second communication and transmits a picked-up image that is currently being picked up to the smartphone 30 by the second communication (step S38). Further, the control section 11 receives settings information and the like that was transmitted from the smartphone 30 and performs settings in accordance with the settings information and the like. For example, the control section 11 adjusts the angle of view by means of the focus and angle of view control section 11b.

In step S39, the control section 11 determines whether or not the main co-operation mode was started. The control section 11 repeats the control in step S38 until the main co-operation mode is started, and when the main co-operation mode is started the control section 11 advances the processing to step S40.

In step S40, the respective control sections 11 and 21 determine whether or not the second communication is necessary. As described above, it is not necessary for the recorder 20 that is a temporary-connection recommended device to connect with the smartphone 30 even while executing a function, and hence the control section 21 of the recorder 20 advances the processing from step S40 to step S41 to end the second communication. On the other hand, at the camera 10 that is a constant-connection recommended device, it is necessary to connect to the smartphone 30 in order to transmit an image that is being picked up, and hence the control section 11 of the camera 10 advances the processing from step S40 to step S42 to continue the second communication. Note that co-operative devices for which the second communication is not used also exist in the co-operation preparation mode. In the case of such co-operative devices, the second communication is started in step S42.

In step S42, as necessary, the respective control sections 11 and 21 transmit a picked-up image or collected sound that was acquired to the smartphone 30 through the second communication. Note that it is not necessary for the recorder 20 to transmit a collected sound, and in step S42 the control section 21 does not particularly perform the transmission of data. On the other hand, in step S42 the camera 10 transmits a picked-up image to the smartphone 30 by the second communication.

In step S43, the control sections 11 and 21 determine whether or not the co-operation mode has ended. The control sections 11 and 21 repeat the processing in step S42 until the co-operation mode ends. When the co-operation mode ends, the control sections 11 and 21 advance the processing to step S44 to perform mode initialization. In the co-operation preparation mode, settings that the user desires are made at the camera 10 and the recorder 20 that are co-operative devices by means of the control section 31 of the smartphone 30. The control sections 11 are 21 are configured to return the settings made by the smartphone 30 to the original state by performing mode initialization in step S44.

In the present embodiment configured as described above, in a case where an information terminal apparatus and a plurality of co-operative devices are operated in the co-operation mode, if the information terminal apparatus has substitutional functions based on information of the by-function guide section, the information terminal apparatus sets the co-operation preparation mode at each co-operative device and performs desired settings while actuating the substitutional functions, and after the setting operation ends, transitions to the main co-operation mode and transitions from the substitutional functions to the functions of the respective co-operative devices. By this means, optimal co-operation control is possible that is in accordance with the time period required for activation as well as the performance and the like of the functions of the information terminal apparatus and the respective functions of the external devices. Further, a configuration is adopted so that, at the time of co-operation, the co-operation is first carried out with a device for which temporary connection is recommended, and thereafter co-operation is carried out with a device for which constant connection is recommended, and therefore it is possible to carry out co-operation that effectively uses the communication necessary for co-operation. Further, when co-operating with an external device that has a sound collection function, an auxiliary display that shows the sound collection range can be displayed on the information terminal apparatus, and the sound collection range can be referred to when putting the sound collecting device in position, and beam forming control for achieving the ideal sound collection can also be simplified by visualization of the sound collection range.

In recent years, the kinds of external devices that are capable of communication are increasing, while on the other hand the kinds of sensors and cameras and the like that personal digital assistants themselves have are evolving together with the operation sections and display sections, and optimization of co-operation between devices in such an IoT environment is an important problem. As described in the foregoing, the present invention enables such optimal co-operation between devices, and solves the aforementioned problem by actuating a function that is required in order to efficiently realize a function that it is attempted to realize at a co-operating external device when co-operating with an external device.

Note that, although in the above described embodiment a camera that acquires images and a recorder that acquires sounds are described as co-operating external devices, various kinds of apparatuses that are capable of communication with an information terminal apparatus can be adopted as co-operating external devices.

Although the above embodiment is described using a digital camera as a device for photographing, the camera may be a digital single-lens reflex camera or a compact digital camera, or may be a camera for moving images such as a video camera or a movie camera, or may be a camera built into a personal digital assistant (PDA) such as a cellular phone or a smartphone.

As long as a system that applies the present invention is a system that sends large-volume data such as images and data of a comparatively small volume that is associated with the large-volume data, the present invention can be used not only in the consumer field, but also in the industrial field and medical field. For example, if an image device has a configuration in which an image pickup section and a display section or operation section are separate bodies to each other, the present invention can be applied to the image device. For example, when examining an inside of a human body, a machine or the like, an image pickup section is inserted into the inside of the human body or machine, and first surface of the human body or the machine is photographed on the operation section side to reduce wasted time. Further, in such case, the present invention can also be applied for a usage application in which only positional information is sent first from the image pickup section on the inside by the first communication to thereby perform positioning prior to transferring an observation image from the image pickup section on the inside by the second communication. Another observation can be therefore performed first, and the next observation or diagnosis can be begun earlier without any waiting time arising for the second communication.

The present invention is not limited to the precise embodiment described above and can be embodied in the implementing stage by modifying the components within a range that does not depart from the scope of the invention. Also, various inventions can be formed by appropriately combining a plurality of the components disclosed in the embodiment described above. For example, some components may be deleted from among all of the components that are disclosed in the embodiment. Furthermore, components from different embodiments may be appropriately combined.

Note that a portion described in the embodiment as a "section" (unit or part) may be constituted by a dedicated circuit or by combining a plurality of general-purpose circuits, and as necessary may be constituted by a processor such as a microcomputer or a CPU that performs operations according to preprogrammed software, or by combining sequencers such as FPGAs. Further, a design is also possible in which an external apparatus is responsible for a part or all of the control, and in such a case communication is performed through a wired or wireless communication circuit that is interposed between the external apparatus responsible for control and the information terminal apparatus and external devices. Communication may be performed by Bluetooth or WiFi or through a telephone line or the like and may also be performed using a USB or the like. A configuration may also be used that adopts an ASIC in which a dedicated circuit, a general-purpose circuit and a control section are integrated. A moving section or the like is constituted by various actuators and, as necessary, a connection mechanism for movement, and the actuators are actuated by a driver circuit. The driver circuit is also controlled by a microcomputer or ASIC or the like in accordance with a specific program. Such control may be subjected to precise correction and adjustment based on information that various sensors or peripheral circuits output.

Further, even when words such as "first" and "next" are used for convenience in relation to the description of operation flows in the claims, the specification, and the drawings, this does not mean that implementation must be performed in such sequence. Further, with respect to portions that do not affect the essence of the invention, naturally respective steps constituting the operation flows can also be appropriately omitted. In particular, although branching and the like are described in a simplified manner, in the case of machine learning using artificial intelligence or the like, branching may be performed that used a much larger amount of determination items. For example, as described in the foregoing, in some cases it is difficult to determine matters such as which device to co-operate with under which circumstances and the like, and whether or not information that is actually acquired is effective or the like, and hence a configuration may be adopted in which machine learning is performed while repeatedly learning results that a user selected, and in a case where such determinations change depending on the circumstances, deep learning that also takes into account such circumstances may be performed.

Note that, among the technology that is described herein, many controls that are described mainly using a flowchart can be set by means of a program, and such programs may be stored on a recording medium or in a recording section. The manner of recording the programs to the recording medium or recording section may be to record the programs at the time of product shipment, or a distributed recording medium may be utilized, or the programs may be downloaded via the Internet.

[Supplementary Note 1]

An information terminal apparatus, including:
an image acquisition section configured to acquire a picked-up image of an object;
a sound collection section configured to collect sounds from a direction of the object to acquire internally collected sounds;
an externally collected sound acquisition section configured to acquire externally collected sounds from a sound collection apparatus which is configured to collect sounds from a direction of the object to acquire the externally collected sounds;
a sound collection position calculation section configured to determine a positional relation between a sound collection range of the externally collected sounds and the picked-up image by a comparison between internally collected sounds that the sound collection section collects and the externally collected sounds that the externally collected sound acquisition section acquires; and
a display control section configured to display an auxiliary display that shows the sound collection position in the picked-up image.

[Supplementary Note 2]

An information terminal apparatus, including:
an input section for built-in function activation configured to activate a specific built-in function that is configured to acquire specific information;
a communication section configured to perform communication with an external device accompanying the specific built-in function activation; and
a control section configured to enable co-operative recording or co-operative playback of information from the external device that is obtained with the communication section, and information acquired by the built-in function.

What is claimed is:
1. An information terminal apparatus, comprising:
a local sensor that acquires local data of a scene, wherein the local data is of a sound or an image;
a display;
a communication section that is communicatively coupled to an external device that is remote from the information terminal apparatus; and
a control section that is communicatively coupled to the local sensor, the display and the communication section,
wherein the control section, in a co-operation preparation mode that is entered before entering a main co-operating mode, is configured to:
acquire the local data from the local sensor,
acquire, using the communication section, external data of the scene from the external device, wherein the external data is of a sound or an image, and
adjust, using the communication section, one or more settings of the external device based on a comparison of the local data and the external data.

2. The information terminal apparatus according to claim 1, wherein the control section in the main co-operation mode is configured to:
acquire co-operating data from the external device, where in the co-operating data is of a sound or an image that is acquired by the external device using the one or more settings of the external device that were adjusted.

3. The information terminal apparatus according to claim 2, wherein the control section in the main co-operation mode is further configured to:
record the co-operating data.

4. The information terminal apparatus according to claim 1, wherein the control section is further configured to:
receive, using the communication section, an indication of whether the external device is a temporary-connection recommended device or or is a constant-connection recommended device
control the communication section to use a temporary connection to communicate with the external device when the indication indicates that the external device is the temporary-connection recommended device, and
control the communication section to use a constant connection to communicate with the external device when the indication indicates that the external device is the constant-connection recommended device.

5. The information terminal apparatus according to claim 1, wherein the control section is further configured to:
search, using the communication section, for the external device based on information that is recorded in a recording section.

6. The information terminal apparatus according to claim 1, wherein the control section is further configured to:
determine whether a co-operating external device is a temporary-connection recommended device or a constant-connection recommended device, based on information that is recorded in a recording section.

7. An information processing system, comprising:
one or more external devices that acquire external data of a scene, wherein the external data is a sound or an image; and
an information terminal apparatus including:
a local sensor that acquires local data of the scene, wherein the local data is a sound or an image;
a display;
a communication section that is communicatively coupled to the one or more external devices; and
a control section that is communicatively coupled to the local sensor, the display and the communication section,
wherein the control section, in a co-operation preparation mode that is entered before entering a main co-operating mode, is configured to:
acquire the local data from the local sensor,
acquire, using the communication section, the external data, and
adjust, using the communication section, one or more settings of the one or more external devices based on a comparison of the local data and the external data.

8. The information processing system according to claim 7, wherein the control section in the main co-operation mode is configured to:
acquire co-operating data from the one or more external devices, where in the co-operating data is a sound or an image that is acquired by the one or more externals using the one or more settings that were adjusted.

9. An information processing method, comprising:
acquiring, by an information terminal apparatus, local data of a scene from a local sensor, wherein the local data is a sound or an image;
acquiring, by the information terminal apparatus, external data of the scene from an external device, wherein the external data is a sound or an image that is a sound or an image;
adjusting, by the information terminal apparatus, one or more settings of the external device based on a comparison of the local data and the external data.

10. The information processing method according to claim 9, wherein the acquiring of the local data, the acquiring of the external data and the adjusting of the one or more settings is performed during co-operation preparation mode, the method further comprising:
after the co-operation preparation mode, acquiring, by the information terminal apparatus, co-operating data from the external device, wherein the co-operating data is a sound or an image.

11. The information processing method according to claim 10, further comprising:
receiving, by the information terminal apparatus, an indication of whether the external device is a temporary-connection recommended device or a constant-connection recommended device;
wherein the acquiring of the co-operating data is performed using a temporary connection when the indication indicates that the external device is the temporary-connection recommended device, and
wherein the acquiring of the co-operating data is performed using a constant connection when the indication indicates that the external device is the constant-connection recommended device.

12. A non-transitory computer tangible readable recording medium which stores instructions, the instructions when executed by a processor cause the processor to:
acquire local data of a scene from a local sensor, wherein, wherein the local data is of a sound or an image;
acquire external data of the scene from an external device, wherein the external data is of a sound or an image; and
adjust one or more settings of the external device based on a comparison of the local data and the external data.

13. The non-transitory computer tangible readable recording medium according to claim 12, wherein the instructions further cause the processor to
acquire co-operating data from the external device, where in the co-operating data is of a sound or an image.

14. The non-transitory computer readable recording medium according to claim 13, wherein the instructions further cause the processor to:
receive an indication of whether the external device is a temporary-connection recommended device or is a constant-connection recommended device
wherein the co-operating data is acquired using a temporary connection when the indication indicates that the external device is the temporary-connection recommended device, and
wherein the co-operating data is acquired using a constant connection when the indication indicates that the external device is the constant-connection recommended device.

* * * * *

UNITED STATES PATENT AND TRADEMARK OFFICE
CERTIFICATE OF CORRECTION

PATENT NO. : 10,404,902 B2
APPLICATION NO. : 15/918381
DATED : September 3, 2019
INVENTOR(S) : Kenta Yumoto et al.

Page 1 of 1

It is certified that error appears in the above-identified patent and that said Letters Patent is hereby corrected as shown below:

In the Claims

In Column 28, Line 53, Claim 4 after "or", delete "or."

Signed and Sealed this
Seventeenth Day of December, 2019

Andrei Iancu
*Director of the United States Patent and Trademark Office*